United States Patent
Dürager et al.

(10) Patent No.: US 11,932,422 B2
(45) Date of Patent: Mar. 19, 2024

(54) DAMAGE ASSESSMENT DEVICE FOR REMOTE CONTROLLED INSPECTION OF AIRCRAFTS

(71) Applicant: IMITEC GMBH, Meilen (CH)

(72) Inventors: Christian Dürager, Meilen (CH); Jannis Erni, Stäfa (CH)

(73) Assignee: IMITEC GMBH, Meilen (CH)

(*) Notice: Subject to any disclaimer, the term of this patent is extended or adjusted under 35 U.S.C. 154(b) by 7 days.

(21) Appl. No.: 17/786,172

(22) PCT Filed: Nov. 12, 2020

(86) PCT No.: PCT/EP2020/081929
§ 371 (c)(1),
(2) Date: Jun. 16, 2022

(87) PCT Pub. No.: WO2021/121803
PCT Pub. Date: Jun. 24, 2021

(65) Prior Publication Data
US 2023/0020727 A1    Jan. 19, 2023

(30) Foreign Application Priority Data

Dec. 20, 2019 (EP) .................................... 19218994

(51) Int. Cl.
*B64F 5/60* (2017.01)
*G01M 5/00* (2006.01)

(52) U.S. Cl.
CPC ............. *B64F 5/60* (2017.01); *G01M 5/0033* (2013.01); *G01M 5/0075* (2013.01)

(58) Field of Classification Search
CPC ..... B64F 5/60; G01M 5/0033; G01M 5/0075; G01M 5/0041; G01M 5/0025;
(Continued)

(56) References Cited

U.S. PATENT DOCUMENTS 6,220,099 B1 * 4/2001 Marti .................. G01N 27/902
                                                            73/633
2004/0262020 A1 * 12/2004 Arntson ................ B23Q 17/22
                                                            173/32
(Continued)

FOREIGN PATENT DOCUMENTS

EP    2108515 A1   10/2009
WO    99/41600 A1   8/1999
(Continued)

OTHER PUBLICATIONS

International Search Report dated Dec. 3, 2020, in corresponding to International Application No. PCT/EP2020/081929; 4 pages.
(Continued)

*Primary Examiner* — Son T Le
*Assistant Examiner* — Matthew W. Baca
(74) *Attorney, Agent, or Firm* — Maier & Maier, PLLC

(57) ABSTRACT

The damage assessment device 16 includes a trolley 4 with a platform 43 carrying a sensor mounting 11 for various non-destructive testing sensors 10 and an additional depth sensor 13 for estimating the depth of a dent, a flexible and partially ferromagnetic rails 2 in order to keep the trolley 4 on the surface of an aircraft structure and allowing the trolley 4 to move perpendicular to a linear scanning axis, formed by the bridge 41 of the trolley 4, and the possibility for remote-control the device via an external control station 14.

15 Claims, 5 Drawing Sheets

(58) Field of Classification Search
CPC ............ G01M 5/0016; G01N 2291/26; G01N 2291/269; G01N 2291/2694; G01N 29/04; G01N 29/041; G01N 29/043; G01N 29/223; G01N 29/225; G01N 29/226; G01N 29/22; G01N 29/26; G01N 29/265; G01N 29/275; G01Q 10/00; G10K 11/004; G10K 11/35; G10K 11/352; G05B 2219/37206; G05B 2219/45066; G21C 17/013; G21C 17/017; G01B 21/22

See application file for complete search history.

(56) References Cited

U.S. PATENT DOCUMENTS

| | | |
|---|---|---|
| 2013/0289766 A1 | 10/2013 | Hafenrichter et al. |
| 2016/0341700 A1 | 11/2016 | Schroeder |

FOREIGN PATENT DOCUMENTS

| | | |
|---|---|---|
| WO | 03/065788 A2 | 8/2003 |
| WO | 2005/002803 A2 | 1/2005 |
| WO | 2008/091314 A1 | 7/2008 |
| WO | 2018/215977 A1 | 11/2018 |

OTHER PUBLICATIONS

Written Opinion of the International Searching Authority dated Dec. 3, 2020, in corresponding to International Application No. PCT/EP2020/081929; 8 pages.

\* cited by examiner

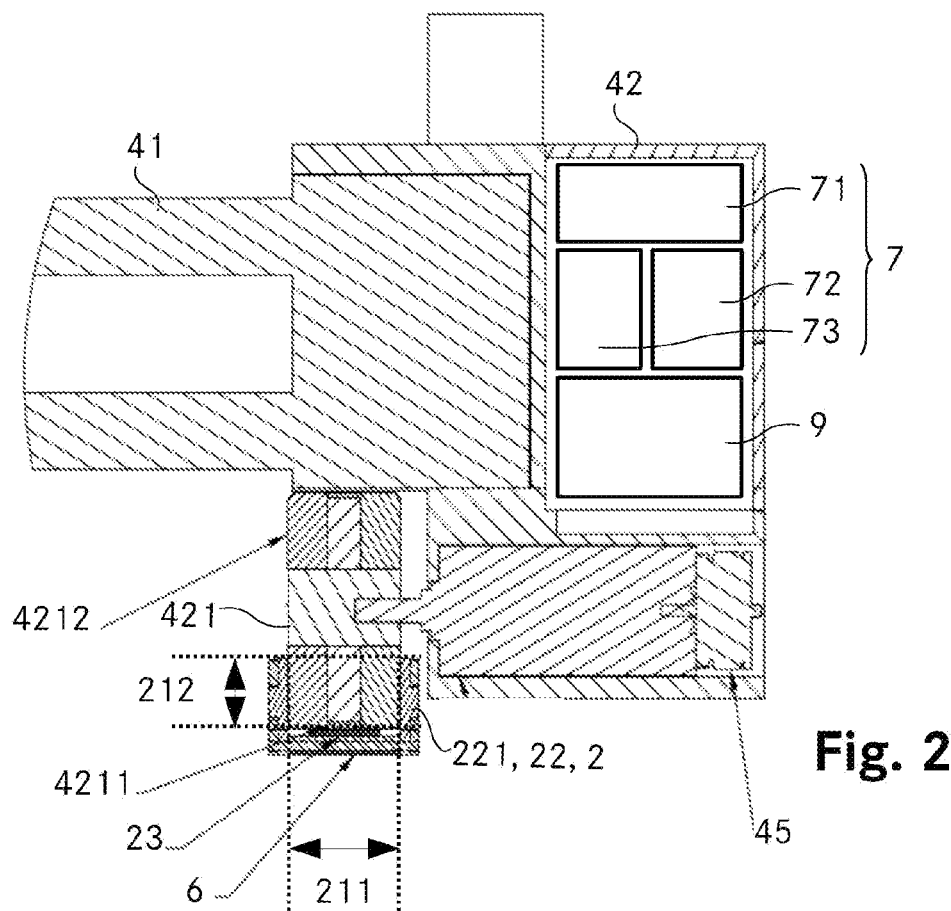
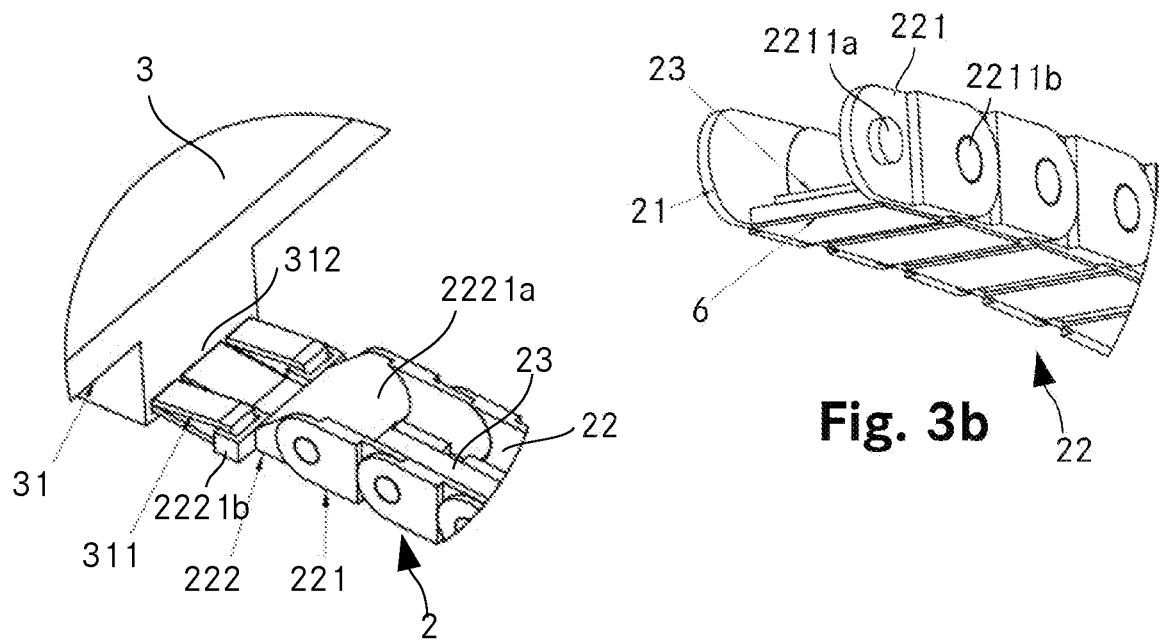
Fig. 3a
Fig. 3b

DAMAGE ASSESSMENT DEVICE FOR REMOTE CONTROLLED INSPECTION OF AIRCRAFTS

FIELD

The invention relates to flexible guide rail system and its transport case and a damage assessment device for inspecting and surveying inspection surfaces comprising the flexible guide rail system. The invention relates further to the use of the damage assessment device to inspect and survey the surface of an aircraft structure and to the method of doing so.

BACKGROUND

In case of a damage to the aircraft surface due to an impact such as for example a bird strike or caused by a ground vehicle an investigation of the damage to the surface is needed. This investigation includes normally the evaluation of the damage size and in some cases a non-destructive testing (NDT) of the damage area. All the required work steps must be carried out by authorized and certified aircraft maintenance personnel. In case the necessary personnel is not present at the actual location of the aircraft, the aircraft cannot release back to operation and must be grounded until the personnel for the required work steps is available. Such an unforeseen ground time causes additional costs for the operator of the aircraft.

The WO 2018/215977 A1 (Invert Robotics) presents a climbing robot for detection of defects on an aircraft body. While it can carry different sensors for non-destructive testing, it cannot inspect reliably and directly dents by measuring their depths directly. This is because the orientation of the robot, and therefore the reference plane changes continuously while the robot moves. Further, to measure the same spot with two or more instruments or twice is in general difficult and involves significant maneuvering of the robot.

The US 2013/0289766 A1 (Boeing) discloses an automated apparatus for performing maintenance functions on airfoil shaped bodies having short chord lengths. The apparatus comprises a blade crawler capable of supporting among other maintenance functions also nondestructive inspection on an airfoil-shaped body. However, the use of the device is restricted to airfoil shaped bodies of short chord lengths.

SUMMARY

It is the object of the invention to create a mounting system for a damage assessment device suitable to be used on curved and flat surfaces, that allows repeated measurements on the same spot, can facilitate the data reduction and which can be mounted and used by anyone without any specialized knowledge.

The mounting system is a flexible guide rail system. The flexible guide rail system according to the invention, comprises two rails, two support beams and a trolley.

Each rail is bendable in only one direction perpendicular to its longitudinal extend. Each rail comprises a guiding-length-section with an at least partially ferromagnetic running surface.

Each support beam comprises an attachment region for supporting one end of one rail. Each support beam comprises two attachment regions located in a scanning distance from each other.

The trolley comprises a bridge, two supporting boxes and a platform. The bridge connects two supporting boxes which are arranged in the scanning distance from each other. The platform is guided by the bridge and is movable along the bridge. Each of the two supporting boxes is equipped with two wheels arranged behind each other. The wheels comprise a permanent magnetic material.

The rails and/or the support beams can be attached to an inspection surface. The rails allow the trolley to follow the inspection surface in a controlled and guided motion once its wheels are placed on the rails. The inspection surface is preferably a section of an aircraft structure made of a non-ferromagnetic material such as aluminium or composite which can be curved.

The inspection surface is the surface which was, or is planned to be, inspected or surveyed. The inspection surface can be curved or it can be flat. Even when undamaged, the inspection surface can comprise structures. These desired structures which give the inspection surface the shape it is supposed to have, are called basis structures in the following.

The support beams can be attached to an inspection surface. The rails, connected to the support beams, follow the inspection surface. The shape of the rail following the surface is called the setpoint-shape in the following.

Due to the magnetic attraction between the magnetic wheels and the running surface of the rails, the trolley can move on slopes and even upside-down on a structure which is not ferromagnetic. Using magnetic attraction allows a faster motion than for example the use of suction cups. Further, there is no need for pumps or similar systems and the connection between the trolley and the inspection surface is less sensitive to dust and dirt on the inspection surface.

Measurements will be done by instruments and sensors mounted to the trolley. Therefore the coordinate system in which the measurements take place is defined by the trolley. For common interpretation and use of the measured data however, it needs to be transformed in a coordinate system linked to the inspection surface.

When inspecting an inspections surface, one is typically searching for variations in properties on length scales smaller than the inspection surface. In the following such variations in properties which are searched by the inspection are called dents when they influence the shape of the inspection surface and they are called defects when they appear in measurements of other surface properties. Damages include dents and/or defects.

In the case of dents in an inspection surface, the scale of the dents is typically smaller than the scale of the basis structure. For example, the bending radius of a dent may be 1 cm while the bending radius of the basis structure may be 10 cm.

A coordinate system linked to the inspection surface follows the basis structure.

The rails have a known minimal bending radius. This minimal bending radius is preferably chosen to be essentially equal to the minimal bending radius of the basis structures. In this case, the trolley follows in one dimension the surface-linked coordinate system, making the data transformation from trolley-based coordinates in surface-linked coordinates particularly simple. Especially, there is no need to know the basis structures to do the data reduction in this dimension. The position coordinate measured along the rails is denoted Y-position in the following.

In the second dimension, the platform follows the bridge. The bridge is a straight connection between the two supporting boxes. If the minimal bending radius of the basis structures is known while doing the data reductions, all observed structures with bending radii greater than the minimal bending radius of the desired structures can be subtracted. Therefore, there is no need for the user to specify the basis structure precisely: It is only needed to set a threshold bending radius which is the threshold between basis structure and dent structure. This threshold setting is typically be done by the manufacturer of the flexible guide rail system. In another embodiment however, the rails of the flexible guide rail system can be chosen by the user and the trolley detects their minimal bending radius and applies this value for the data reduction. In a further embodiment, the rails can be manipulated, directly or via remote control, such that their minimal bending radius changes and in addition the value can be inputted into and used for the data reduction.

Preferably, the support beams are equipped with handles. This gives an unskilled person a clear and intuitive instruction on where to hold the device and makes handling comfortable and easy. Further, the connection of the support beams to the inspection surface can be tested easily by pulling on the handles.

The term attachment region should be understood in a broad sense including for example regions allowing an abutment, a contact, a mounting, a fixture, a connection, a joint, a bearing and/or a support of the rail or of parts of it.

In one embodiment, each rail comprises a flexible carrier ribbon and a plurality of ferromagnetic tiles of similar, rectangular shape. The tiles are mounted to the carrier ribbon in such a way that long sides of adjacent tiles face each other. In this way the tiles form the running surface with a width defined by the length of the long sides of the tiles. The flexible carrier ribbon is preferably made of textile material. Preferably, the tiles are arranged with small gaps between each other.

In this way it is particularly easy and cost efficient to produce rails of essentially any length needed. Further, the bending radius of the rails for bending in one direction can easily be adapted to the desired value by varying the distance between two subsequent tiles and/or the thickness of the tiles. If a flexible carrier ribbon is used, the bending radius in the opposite direction can be significantly smaller, allowing to fold the rails to transport them easily.

In one embodiment, each rail comprises a ferromagnetic metal mesh forming the running surface of the respective rail. Preferably the metal mesh is fixed to a carrier ribbon. This embodiment is also cost efficient and easy to produce.

In one embodiment, the carrier ribbons are connected to the attachment regions of the respective support beams, preferably by the use of adhesive.

Using the carrier ribbons for the connection and not the parts forming the ferromagnetic running surface reduces the number of connections between the load carrying part of the rails, which is preferably the carrier ribbon, and the support beams and increases therefore the reliability of the guide rail system.

In one embodiment, at least some ends of the rails are connected to the respective attachment regions by permanent connections such as adhesive or soldered connections. In this embodiment, it is preferably possible to tighten the rails by addition tightening means such as rubber bands. In one embodiment, all ends of all rails are connected to attachment regions by permanent connections.

In a preferred embodiment, the rails can be completely released from attachment regions by releasable connections such as ratchets, hooks, screws and similar means. In this embodiment, it is preferably possible to connect and to tighten the rails by fixing them to the attachment regions. However, in one embodiment, there is a releasable connection in addition to tightening means.

In one embodiment, the attachment region comprises contacting means. The contacting means can be part of tightening means and/or part of a releasable connection In one embodiment, the flexible guide rail system comprises a Velcro fastener. A first part of the Velcro fastener is equipped with an adhesive which can stick in a removable way to the inspection surface. The Velcro fastener is a part of the rail. Preferably, the Velcro fastener is the carrier ribbon or it is directly fixed to the running surface.

This embodiment has the advantage that the guide rail system can be removed from the inspection surface in two steps: First the Velcro connection can be opened whereby the rails and the support beams can be removed. Only the first part of the Velcro remains on the inspection surface. In the case that the adhesive sticks unexpectedly strong to the surface, a user may simply leave it on as the Velcro fastener part is in general sufficiently soft to pose no danger is case of getting loose during a flight. On the other hand, this setup allows remove the technically advanced and more expensive parts of the guide rail system even in cases where removing the adhesive requires stronger forces and/or chemicals which may interact and could damage the rail and/or the support beams if they were still present. If the first part of the Velcro fastener gets damaged in the process of removing it, it can easily be replaced.

A further advantage of using a Velcro fastener to fix the rails is that the connection between the first and the second part can be sufficiently strong over a range of different distances between the first and the second part. This allows the rails to adjust for curvature of the inspection surface perpendicular to the longitudinal extend of a rail: The Velcro fastener can compensate the curvature even in the case of a running surface which cannot adopt to the curvature.

In one embodiment, the Velcro fastener has essentially the same length and width as the rail it is fixed to. This ensures a reliable and strong connection of the rails to the inspection surface. In another embodiment, the Velcro fastener comprises a plurality of sections with a width similar to the width of the rail but shorter in their lengths. Fixing the rails with only sections of Velcro has the advantage that less material is needed.

In one embodiment of a flexible guide rail system, the trolley comprises two displacement sensors. Preferably each supporting box is equipped with one of the two displacement sensors. Each displacement sensor is capable to observe the displacement of one supporting box relative to the rail on which the wheels of this supporting box are running on. A control of the wheel-motors, which is preferably part of a main system, compares the observations and controls the wheels in such a way that the difference between the displacements is minimal Preferably, the control of the wheel-motors stops the motion of the wheels if the detected difference between the displacements is greater than a threshold.

Using the displacement sensors for a control loop allows to ensure that the trolley stays on the rails while moving. As the rails are only bendable in one direction, both supporting boxes should move with the same speed: If one of the supporting boxes has a greater displacement than the other in a given time frame, the trolley drives a curve and would probably lose contact with the rails, if this motion is not corrected or stopped. Consequently, the control of the wheel-motor corrects in this embodiment the motion if this is still possible or stops the trolley completely if the detected difference is too large.

This embodiment is capable to control the trolley even if there is some slip of the wheels on the rails.

The displacement sensors can be used for determining the Y-position of the platform of the trolley in addition to being used to control the motion of the trolley.

In one embodiment of a flexible guide rail system, the trolley comprises two displacement sensors. Each displacement sensor is capable to observe the displacement of one supporting box relative to the rail on which the wheels of this supporting box are running on. Preferably each supporting box is equipped with one of the two displacement sensors. A main system, compares the observations of the two displacement sensors and determines a corrected y-position and x-position of the platform from the data which considers local differences in the curvatures of the rails. For example, the corrected x-position and y-position can be the coordinates in a projection of the flexible guide rail system onto a plane defined by the first support beam and the direction of the rails at the attachment regions of this first support beam.

In one embodiment, the rails are equipped with markings and the displacement sensors are contactless sensors detecting and counting the markings passing their field of view, Preferably, the markings are a striped pattern with the strips running perpendicular to the longitudinal extend of the rails. In another embodiment, there are no explicit markings and the displacement sensors detect and count the tiles, a structure of the metal mesh or a structure of the carrier ribbon. Preferably, the contactless sensors used as displacement sensors are optical or infrared sensors.

These embodiments allow a precise control as the received signals will be similar and essentially periodic and detecting the difference in the displacement comprises simply the step of detecting a difference in the periodicity of the two signals.

The use of special markings has the advantage that they can be well defined and optimized to be detectable by the respective sensor. Using repetitive structures present on the rails such as the tiles, the structure of a metal mesh or structures of a carrier ribbon eliminates the need to create or to fix markings on the rail.

In a flexible guide rail system according to one embodiment, the trolley comprises at least one positioning sensor. Preferably, each supporting box is equipped with at least one positioning sensor. The positioning sensor is capable to determine at least one longitudinal feature of the rail. Preferably, the longitudinal features is an edge of the running surface of the rail. A control of the wheel-motor, which is preferably part of a main system, controls the wheels such that appearance of the longitudinal feature as observed by the positioning sensor stays essentially the same.

Preferably, the control stops the motion of the wheels if the appearance of the longitudinal feature changes more than a predefined amount. The positioning sensor is preferably a contactless sensor. Preferably the contactless sensor used as positioning sensor is a capacitive or inductive sensor.

The appearance of the longitudinal feature can, for example, be a signal indicating the distance between the sensor and the feature or it can be a set of pixels on a 2D detector where the feature appears.

In this embodiment, the trolley is controlled to keep a constant distance to the observed longitudinal feature. In this embodiment, the control loop needs only a single sensor, however, for more reliable results and for cases where the curvature of the two rails may differ, detecting more than one longitudinal features with more than one sensor is advisable or needed.

This embodiment is particularly useful if the flexible guide rail system is intended to be used on inspection surfaces with significantly spatially varying curvature. On such surfaces, the length of the sections of the rails which are separated by the scanning distance from each other may vary, resulting in situations where one of the supporting boxes of the trolley is requires to move faster than the other on in order to stay on the rails. This adaption of the speed is easily archived when a positioning sensor is used to control the motion.

As the inspection surface is in general non ferromagnetic and of a different electrical conductivity compared to the running surface of the rail, a detector sensible to the conductivity or magnetic properties of the material can detect the edge of the running surface easily.

As the sensor is mounted to the trolley, controlling the wheels in such a way that the edge or another longitudinal feature appears always similar in the sensor signal ensures that the orientation and the position of the trolley relative to the rails is kept. The predefined amount of change of the appearance at which the motion of the wheels is preferably stopped may depend on the width of the rails and the width of the wheels: The wheels of the trolley should not leave the running surface of the rails.

According to one embodiment, a flexible guide rail system comprises two rails, two support beams and a trolley. Each of the rails is bendable in only one direction perpendicular to its longitudinal extent. Each of the rails comprises a guiding-length-section where its cross-section is u-shaped and wherein the bottom of this u-shape is at least partially ferromagnetic and wherein the sides of this u-shape are preferably non-ferromagnetic and wherein the distance between the sides of this u-shape is the inner u-shape width and wherein the height of the sides of this u-shape, measured from and perpendicular to the bottom of the u-shape, is the inner u-shape height.

Each of the support beams comprises two attachment regions located in a scanning distance from each other. Each attachment region can support one end of one of the rails. Further, each support beam comprises adhesion means, preferably two suction cups.

The trolley comprises a bridge, two supporting boxes and a platform. The bridge connects the two supporting boxes which are arranged in the scanning distance from each other. The platform is guided by the bridge and is movable along the bridge.

Each of the two supporting boxes is equipped with two wheels arranged behind each other. The wheels comprise a permanent magnetic material. The radius of every one of the wheels is greater than the inner u-shape height. The thickness of the wheels is smaller than the inner u-shape width.

The support beams can be attached to an inspection surface. The rails, connected to the support beams, follow the inspection surface. This flexible guide rail system allows the trolley a controlled and guided motion along the inspection surface once its wheels are placed in the rails. The inspection surface is preferably a section of an aircraft surface, especially an aircraft surface made of a non-ferromagnetic material such as aluminium or composite. Preferably, the inspection surface is curved.

Using magnetic wheels on rails which comprise ferromagnetic material on the running surface but not on its sides ensures a safe and reliable guidance of the trolley.

The rails are attached to the inspection surface via the support beams reducing the number of surface connections which need to be established.

The at least partially ferromagnetic bottom of the u-shape of the guiding-length-section of the rail is the running surface of this rail.

In an embodiment, each rail comprises a guide rail and an insert. Further, each attachment region is equipped with guide rail attachment means to connect one end of one of the guide rails and insert attachment means to connect one end of one of the inserts. The rail comprises the guide rail and the insert, whereby the insert forms the ferromagnetic part of the rail.

Each guide rail has a guiding-rail-length-section. The guiding-rail-length-section has a u-shaped cross-section. The guide rail is made of non-ferromagnetic material, preferably a plastic.

Preferably, the guiding-length-section comprise a plurality of essentially identical guide-rail elements having a u-shaped cross-section and comprising first coupling means on one end and second coupling means on an opposite end and wherein the first coupling means of a first guide-rail element can couple to the second coupling means of a second guide-rail element in such a way that a pivot axis is formed around which the first and the second guide-rail element can pivot relative to each other.

Each of the inserts is a flat band with a length greater than the length of the guiding-rail-length-section and with a width smaller or equal to the inner u-shape width.

The insert comprises an uninterrupted strip of ferromagnetic material, preferably steel, along its length. Preferably, the insert is made of steel.

In one embodiment, the thickness of the insert is equal or greater than the inner u-shape height of the guide rail. In this embodiment, the guide rail guides the insert but not the wheels of the trolley.

This prevents collisions between the guide rail and the wheels of the trolley in cases where the orientation of the inspection surface of the one rail is different from the one of the other rail.

In one embodiment, the thickness of the insert is smaller than the inner u-shape height of the guide rail. In this embodiment, the guide rail forms borders which guide the wheels of the trolley in addition to the guiding the insert. The guide rail prevents the trolley from leaving the rails in this embodiment, even in the absence of a control loop.

This embodiment is particularly simply to construct. Typically, the minimal bending radius of the rails is determined by the guide rail and therefore changing it, involves only a change on the guide rail but not on the insert. Further, having the u-shaped cross-section, bending the guide rail results often in a change of the total length of the guide rail. By constructing the rail out of two separate structure, this shortening of the guide rail does not affect the length of the insert. The insert can therefore be used as an indicator for a desired, predetermined length. Knowing that the rails connecting the two support beams have in one embodiment always the same predetermined length simplifies the measurements and allows to detect problems such as slipping of the trolley.

In one embodiment of the flexible guide rail system the guide rails comprise on each end guide rail attachment elements. The guide rail attachment elements have a guiding-length-end and a support-beam-end. The guiding-length-end comprises the first or the second coupling means. The support-beam-end and the guide rail attachment means are adapted in such a way that they can form a length-adaptable connection. Preferably the support-beam-end and/or the guide rail attachment means comprise an elastic band or a ratchet.

A ratchet is, in the sense of this document, a connection system comprising an insertable section and a pawl. The pawl fixes the insertable section against motion in one direction, i.e. the insertable section cannot be pulled out of the pawl without a user actively lifting the pawl. In the case of the first ratchet, the insertable section is preferably the insert and the pawl is preferably a clamp on the guide rail attachment element. In the case of the second ratchet, the insertable section is preferably an elongated section on the support-beam-end of the guide rail attachment element or an elongated section of the guide rail attachment means and the pawl is integrated in the attachment region of the support beam or in the guide rail attachment means.

This embodiment allows to adapt the nominal length of the guide rails simply by adding further guide rail elements between the guide rail attachment elements. As explained above, the length of the guide rail may change depending on how much it is bend while this is not the case for the insert. The resulting length difference between guide rail and insert can in this case be equalized by the length-adaptable connection between support beam and guide rail.

In one embodiment, the guide rail is constructed such that the length of its bottom becomes shorter with decreasing bending radius where the bottom is directed towards the bending centre. Such a property arises when the guide rail is constructed from guide rail elements which are coupled to each other by first and second coupling means which form a pivot located above the bottom of the guide rail elements. In this embodiment, this guide rail is equipped with first ratchets on both of its ends to fix the length of the insert between the first ratchets.

By connecting the insert with first ratchets on both end of the guide rail in its setpoint-shape, the length of the insert between the two first ratchets defines the maximum length available to the bottom of the guide rail. Bending the guide rail less than it is the case in the setpoint-shape would imply an elongation of the bottom of the guide rail which is prevented by the insert. Consequently, fixing an insert with a negligible elongation under tension on both ends of such a guide rail is an efficient and simply way to limit the degrees of freedom available to the guide rail once it is in its setpoint-shape. The setpoint-shape is the shape of the rail when is following the inspection surface.

A negligible elongation under tension is preferably an elongation of less than 5%, especially less than 1%, under a tension at which the first ratchets start to fail.

In one embodiment, the insert has a first minimal bending radius and a negligible elongation under tension, and the guide rail has a second minimal bending radius and the length of the bottom of the guide rail becomes shorter with increasing amount of bending around a convex surface. The guide rail is on both ends equipped with a first ratchet which allows the insert do decrease its length between the two first ratchets but prevents the insert from increasing its length between the two first ratchets. The first minimal bending radius is smaller or equal to the second minimal bending radius. The first minimal bending radius is greater than greatest possible distance between insert attachment means and the first ratchet. The greatest possible distance between the insert attachment means and the first ratchet is preferably depending on the greatest length of the length-adaptable connection.

A minimal bending radius is in general given by the guide rail itself. But the insert can be used to limit the bending to a value above this minimal bending radius, thereby setting a situation depending lower limit on the amount of bending: An increase of bending decreases the length of the bottom of the guide rail even further. If the ratchet system is such that the insert can pass is one direction but not in the other and if it is installed such that the length of the insert between the two ratchets can only decrease, an increase of bending of the guide rail shortens the length of the bottom of the guide rail between the ratchets and this in turn pushes the insert on both ends through the ratchets, decreasing the length of the insert between the first ratchets and increasing the length of the ends of the insert. The space for the ends of the insert is the region between the first ratchet and the insert attachment means of the support beam. However, this space is limited and, assuming that the rails and the support beam are correctly installed, already filled by the insert ends in its original length. Therefore, the support beams stop the insert from moving further through the ratchets. As the distance between the ratchets and the insert attachment means is short, by choosing an insert having a similar minimal bending radius as the guide rail and by choosing both minimal bending radii to be larger than the distance between ratchet and insert attachment means, it is not possible for the insert to fit the additional length between ratchet and support beam by bending itself. Consequently, a pressure is created which prevents that the section of the insert between the ratchet and the insert attachment means increases. Due to this pressure the length of the insert between the ratchets cannot decrease and consequently the length of the bottom of the guide rail cannot decrease once the insert is fixed to it. As an increased bending would result in a decreasing length of the bottom, increasing the bending is hindered by the insert, too.

As therefore neither an increase in the bending nor a decrease is possible, the guide rail is in this embodiment very limited in changing its shape once the insert is installed. In addition, the shape is further restricted by the inspection surface: In the case at hand, the setpoint-shape follows the inspection surface. Any transition from the setpoint-shape to a shape which has the same amount of bending as the setpoint-shape but is different from it, will lift the rail of the surface at more than one place. Assuming that the minimal bending radius is sufficiently large, this lifting off the surface causes a pulling force on the guide rail attachment means on the support beams. As the guide rail attachment means are fixed with respect to the inspection surface they hold the rail tight and prevent thereby the change of the shape.

Therefore, due to the presence of the inspection surface and the fixed position of the guide rail attachment means, also transitions between shapes, which would theoretically be allowed by restrictions due to the insert, are prevented.

Preferably, the minimal bending radius of the guide rail is greater than ½ of the maximal bending radius of a concave basis structure to be considered. Preferably, larger scale concave basis structures are avoided by using shorter guide rails.

This system to keep the guide rails and the insert in their setpoint-shape allows the trolley to follow the inspection surface, even if it is concave.

In one embodiment of the flexible guide rail system the radius of the wheels is smaller than three times, preferable smaller than twice, the inner u-shape height.

According to this embodiment, a significant part of the wheels is inside the channel formed by the sides of the u-shape of the cross-section of the rail. This ensures a secure guidance even in difficult situations. Further, it ensures that the insert does not leave the channel easily.

In one embodiment of the flexible guide rail system adhesive tape is at least partially mounted to the outer bottom side of the guiding rail, the guide rail, the running surface or the carrier ribbon to allow an adhesive contact between the guiding rail, the guide rail, the running surface or the carrier ribbon and an inspection surface on which the flexible guide rail system is used.

The use of adhesive tape can prevent a side-way slipping of the rails on the inspection surface which is in general curved and it can be used to ensure that the rails follow concave surface structures. The adhesive tape is preferably such that it can be pulled off the inspection surface once the inspection or damage assessment process is done. Preferably, the adhesive tape can be used for more than one measurement and stays on the rails.

In one embodiment, the adhesive tape is a Velcro tape comprising a first and a second part of a Velcro fastener and wherein the first part is equipped with the adhesive.

In one embodiment of the flexible guide rail system only one of the wheels of each supporting box is powered. Preferably each supporting box comprises a wheel-motor. Most preferably the wheel motor is an electrical motor.

Powering only one of the wheels allows to simplify the mechanics inside the supporting box. Equipping each supporting box with its own wheel motor has the advantage that a transmission through the bridge can be avoided. Further, it is preferred to equip both supporting boxes with similar parts in order to avoid artefacts in the measurements and differences in the motion of the supporting boxes on the rails.

In one embodiment of the flexible guide rail system at least one, preferably both supporting boxes comprise at least one proximity sensor which can determine a contact or a predefined distance to at least one of the support beams. Preferably, the proximity sensor is an inductive sensor.

In one embodiment of the flexible guide rail system the platform comprises at least one proximity sensor which can determine a contact or a predefined distance to at least one of the supporting boxes. Preferably, the proximity sensors are inductive sensors.

In one embodiment of the flexible guide rail system at least one of the supporting boxes comprises at least one proximity sensor which can determine a contact or a predefined distance to the platform. Preferably, the proximity sensor is an inductive sensor.

The presence of such sensors allows the trolley and/or the platform to find a defined starting position in the flexible guide rail system. The user may place the trolley anywhere on the rails. Analogously, the platform may be anywhere on the bridge, for example because of the handling when installing the flexible guide rail system. In order to follow a desired measurement protocol, preferably the flexible guide rail system has information about the location of the trolley respectively the platform. Simply moving until at least one of the supporting boxes is in a predefined distance to a support beam gives such a starting position for the trolley position. A motion of the platform until it has a predefined distance to one of the supporting boxes gives a starting position for the platform. In addition, by equipping both supporting boxes with proximity sensors, possible non-alignments between the wheels of the two boxes can be corrected and/or the position measurement can be calibrated. By comparing the theoretical distance between the support beams with the distance measured on the trolley, e.g. by encoders on a wheel, slipping of wheels and similar problems can be detected.

In one embodiment of a flexible guide rail system a tread of each wheel is at least partially an anti-slip surface and partially a smooth ferromagnetic or permanent magnetic surface. Preferably the anti-slip surface is a central section made of rubber.

Enabling a direct contact between the ferromagnetic part of the rails and a smooth ferromagnetic surface of the wheel enables a strong coupling of the trolley to the rails as the contact area is large and the distance between the magnetic wheel and the surface it is attracted to, the ferromagnetic part of the rail, is minimized. However, smooth surfaces made of typical ferromagnetic or permanent magnetic materials have a low friction. On slopes and depending of the weight of the trolley, slipping of the wheels on the rails is a risk. In order to avoid slipping, the wheels can be equipped with an anti-slip surface covering part of the tread of each wheel. Such an anti-slip surface can be provided by using a surface material with a high friction and/or by structuring the wheels. It is also possible to provide an anti-slip surface on the bottom of the u-shape of the rails and/or to structure it. In one embodiment, the wheels and the rails are structured in a complementary way.

Forming part of the tread from a smooth ferromagnetic surface and covering parts of it with an anti-slip surface combines a strong coupling between wheels and rails with a high traction and consequently a low risk of slipping. Choosing a symmetric arrangement of the parts, for example arranging the anti-slip surface in a central section, prevents the formation of an angular momentum due to unbalanced forces on the right and the left side of the wheel. Rubber is a material which has on a typical ferromagnetic surface a significantly higher friction compared to typical ferromagnetic or permanent magnetic materials.

Preferably the wheels are constructed such that the anti-slip surface and the smooth ferromagnetic surface form together a smooth cylindrical surface.

Preferably, the smooth ferromagnetic or permanent magnetic surface is covered by a thin layer of a protective coating.

In one embodiment, the trolley comprises a toothed belt contacting the platform. The trolley comprises further a platform-motor. The platform-motor is preferably an electrical stepper motor. Preferably, the platform-motor is located in one of the supporting boxes.

To position the sensor precisely the platform should move along the bridge relative to the supporting boxes in a precisely controlled manner. A toothed belt allows such a precise position control. As the movement of the toothed belt is controlled by the platform-motor, information about the amount of movement caused by the platform motor in a given direction are a way to determine the position of the platform. If the platform-motor is a stepper motor, such a position information results directly from the driving signal of the motor. The platform-motor or the belt can be equipped with an encoder which returns information about the amount of movement caused by the platform-motor.

Locating the platform motor in one of the supporting boxes has the advantage that the weight of the platform and therefore the weight to be moved by the platform-motor is reduced and that the position data of the platform does not need to be transferred from the platform to the supporting box. This has the advantage that the platform itself does not require any energy to be positioned at a desired location. Only when it is arrived at this desired location, its sensors and wireless transmitter need to be switched one. This reduces the overall energy consumption and allows to reduce the size of an energy storage on the platform thereby reducing the weight of the equipped platform and thereby reducing the overall energy consumption of the flexible guide rail.

In one embodiment, the flexible guide rail system comprises a main system.

A main system is a system comprising a wireless transmitter, a memory and a microcontroller. The main system can receive control commands, position and measurement data from the supporting boxes, the platform, sensors and/or an external control station. The main system processes the received data and commands and transmits data and/or results and/or commands to the other supporting box, the platform, sensors and/or the external control station.

In one embodiment of the flexible guide rail system each supporting box comprises an energy storage and at least one supporting box comprises a wireless transmitter, a memory and a microcontroller, preferably the main system. Preferably both supporting boxes comprise a wireless transmitter. Preferably both supporting boxes comprise a memory. Preferably both supporting boxes comprise a microcontroller.

In one embodiment, there is a cable for data and/or energy transmission from one supporting box to the other, running along or though the bridge. In one embodiment the bridge is used for energy and/or data transfer. In one embodiment, data and/or energy transmission from at least one supporting box to the platform is realised through the bridge, preferably by a cable and/or by sliding contacts such as brushes.

In one embodiment of the flexible guide rail system at least one of the support beams comprises an energy storage, a wireless transmitter, a memory and a microcontroller.

Equipping both supporting boxes with an energy storage allows to avoid power cables along the bridge. This in turn allows to adapt the flexible guide rail system to different scanning lengths by connecting the supporting boxes to a bridge of a different length, the platform to the bridge of the different length and to connect the rails to support beams with attachment regions located in the changed scanning length from each other.

Preferably, the wireless transmitter is also a receiver and it can receive position data of one or both supporting boxes and of the platform. Preferably, it can further receive measurement data from sensors mounted on the platform. Preferably, it can further receive control commands from an external source such as an external control station. The wireless transmitter can transmit position data and status information to a server or to an external control station. Preferably, the wireless transmitter can transmit measurement data and/or results of the analysis of the measurement data to a server or to an external control station.

In one embodiment, a wireless transmitter of one supporting box transmits data about the position of this supporting box to the wireless transmitter on the other supporting box. Preferably, the main system is located in one of the supporting boxes.

Preferably, there is a microcontroller and a memory in both supporting boxes and both supporting boxes determine their position and preferably also the position of the platform independently from each other locally. In this case, there is preferably one microcontroller receiving the data from both supporting boxes and combining them and checking them for consistency. This microcontroller can be part of the main system.

Preferably, the main system and its energy storage are in a first supporting box which is different from the second supporting box which carries the platform-motor and an energy storage for the platform-motor.

This arrangement of the different parts allows to construct the first and the second supporting box such that they have a similar weight and a similar heat production during use. This reduces the risk that the measurement results depend on the orientation of the trolley on the rails.

In one embodiment the main system is located in one of the support beams which is also equipped with an energy storage. As the support beam is an unmoved part of the flexible guide rail system, this allows the use of a larger and heavier components allowing to conduct more complex analysis and data reduction in the flexible guide rail system itself.

Preferably, the support beams are passive structures which do not comprise any electronic components. This has the advantage that the number of energy storages needed is lower and consequently the maintenance work, too.

Preferably, the energy storages are electrical energy storages such as batteries, preferably rechargeable batteries, or supercaps.

In one embodiment of a flexible guide rail system a control of the wheel-motors and/or an encoder monitoring the wheel-motors and/or sensors detecting position markings produces Y-position of the platform in a direction along the guide rail.

In one embodiment, the positions markings for producing the Y-position of the platform are used as markings to be observed by displacement sensors to control the motion of the trolley on the rails. In one embodiment, the sensors detecting the position markings for producing the Y-position of the platform are displacement sensors. Preferably, the control of the wheel-motors is part of the main system.

A control of the platform-motor and/or an encoder monitoring the platform-motor and/or sensors detecting position markings produce X-position of the platform in a direction along the bridge.

Preferably, the X-positions and the Y-positions are processed by at least one of the microcontrollers and stored in the memory. Preferably, the X-positions and the Y-positions are processed by the main system. Preferably, information about a difference in curvature of the rails, for example obtained by the observations of positioning and displacement sensors, is included in the processing step of the X-position and the Y-position.

X and Y are position coordinates in the flexible guide rail coordinate system: Y is the position along the rails and as explained above, essentially a position in a surface-based coordinate system. X is the position along the bridge. The X component may differ from the surface-based coordinate system, however the shape of the bridge is, in contrast to the shape of the rails, known and fixed for a given flexible rail system. Therefore, any artefacts resulting from a possible difference between a surface-base coordinate system and the X direction of the flexible guide rail coordinate system can be considered during the data processing.

If a stepper-motor is used as wheel-motor or as platform-motor, its control signal determines the position in X or Y direction. If the case that another drive or motor is used, encoders placed at a suitable location, for example on the axis driving the wheels or the toothed belt, can be used to determine the position. Finally, the rails and/or the bridge can comprise markings which, when detected, give an X or a Y position.

Preferably, a starting position indicated by a proximity sensor is compared with a position determined from a monitoring of a motor control signal and/or encoders.

In this case, the starting position, as detected by proximity sensors, especially inductive sensors, can be used to recalibrate a position measurement using the motor control signal and/or encoders.

A sensor with sensor mounting comprises a sensor. The sensor comprises a sensor head and preferably a mounting surface. The sensor mounting comprises a flat circular base plate with a central opening and an outer thread. The diameter of the base plate is preferably larger than the scale of surface roughness and smaller than the scale of the dents. The sensor mounting comprises further a screwable sleeve, a three-dimensional bearing and a sensor holder. The sensor head is placed in the central opening of the circular base plate. The screwable sleeve is placed over the sensor and screwed onto the outer thread of the circular base plate such that the sensor and the circular base plate are connected. The assembly of sensor, circular base plate, and screwable sleeve is mounted to the sensor holder by the three-dimensional bearing.

The sensor is preferably a sensor for non-destructive testing.

In one embodiment, the sensor mounting comprises a spring. The spring is placed on the mounting surface of the sensor and inside the screwable sleeve such that it pushes the sensor head through the opening of the circular base plate.

Thereby the sensor head is pushed onto the inspection surface ensuring a surface contact of the sensor head with a defined force.

There are essentially structures of three different magnitudes on the inspection surface: As mentioned above, the inspection surface has its basis structure, e.g. the structure of an airfoil. On a smaller scale, there may be dents and defects which are the structures of interest for the inspection and measurements conducted with the flexible guide rail system. Finally on an even smaller scale, there is a surface roughness which are surface structures considered to be irrelevant.

The circular base plate causes the device to follow only surface structures with a scale greater than the surface roughness. However, the three-dimensional bearing allows the sensor to follow all possible dents and the basis structures of the inspection surface.

While the surface roughness should be ignored when determining the orientation of the sensor head, its presence may change the distance between the center of the circular base plate and the inspection surface. Many non-destructive testing methods depend on a direct contact of the sensor head to the inspection surface. The spring loading allows to establish such a direct contact while the other parts of the sensor mounting ensure the desired orientation of sensor head.

Examples for non-destructive testing are eddy current testing, ultrasonic testing, terahertz testing, shearographic testing, thermographic testing or visual testing.

A damage assessment device comprises a flexible guide rail system and a sensor with a sensor mounting as described above, which is fixed to the platform of the flexible guide rail system.

In one embodiment, the sensor with sensor mounting comprises further a bracket. The bracket comprises a sliding rail and a spring and bolt system. The sensor holder comprises a sliding rail guidance which is formed complementary to the sliding rail. The spring and bolt system pushes the sensor holder along the sliding rail in one direction with a defined force.

This embodiment allows the sensor to follow the inspection surface even in the case of dents with significant depth.

In one embodiment, a damage assessment device comprises a sensor with sensor mounting which is fixed with its bracket or its sensor holder to the platform of a flexible guide rail system.

The sensor is preferably a sensor which needs to be pushed onto the inspection surface to be measured perpendicular and with a defined force.

The flexible guide rail system allows to position the sensor precisely. The sensor mounting keeps the sensor in the needed orientation and provides a constant contact pressure. The sensor captures the desired measurement data. Therefore, all requirements of the measurement are fulfilled by the damage assessment device itself. There is no need to specialized knowledge or skill of the user.

In one embodiment of a damage assessment device a sensor is mounted to the platform in a fixed position and orientation with respect to the platform. Preferably the sensor mounted to the platform in a fixed position and orientation is a depth sensor.

Dents are surface structures and therefore they can be inspected by measuring the distance between the platform and the inspection surface at many positions. Thereby the inspection surface is scanned. Such a scan can be done by moving the platform along the bridge and by moving the trolley along the rails. Thereby, essentially the whole region between the supporting bars and the rails can be scanned and inspected.

In one embodiment, the depth sensor is mounted to the sensor mounting. Thereby, if the sensor mounting is attached to the platform with the spring and bolt mechanism and the sliding rail system, the depth sensor measures the small scale height variations of the surface roughness and can be mounted closer to the inspection surface. This can increase the accuracy of the depth measurements.

In one embodiment, the depth sensor is mounted to a sensor mounting with a larger base plate than the base plate of the sensor mounting of a second sensor, preferably of the non-destructive testing sensor.

In one embodiment of the damage assessment device the platform comprises a energy storage and a wireless transmitter wherein the energy storage powers one or more of the sensors mounted to the platform and/or the wireless transmitter of the platform and whereby the wireless transmitter transmits data from sensors mounted to the platform to the wireless transmitter of the main system.

The data form the sensors can be data about the status of the sensors as well as measurement data.

Preferably, the platform comprises a clock and the sensor and measurement data transmitted to the main system comprise time stamps. Preferably the X and Y position data comprises also time stamps. Preferably, the main system combines the position data and the sensor and measurement data by comparing the time stamps such that sensor and measurement data captured at a given time are associated with the position determined for the same time.

This system has the advantage that no data or power cables are needed between a supporting box and the platform. This increases the reliability of the system. In addition, the use of time stamps makes the measurement process independent of possible time lags in the data transmission.

In one embodiment, all sensors mounted to the platform are equipped with their own energy storage and wireless transmitter.

In one embodiment of the damage assessment device the main system analyses the received data for consistency and completeness and issues control commands to the wheel and/or the platform motor and/or the sensors to capture further measurement data at a desired location and/or to stop measuring and/or to move the platform to a desired location if needed.

The received data are preferably sensor and measurement data.

In this way the damage assessment device resolves by itself and without need for feedback from the external control station some common problems. Instructions causing an unusual motion patter, for example a return to a starting position, may also be a way to communicate with a person handling the damage assessment device.

For example, the wheels can be controlled to run backwards to bring the trolley in a safe position if the amount of slipping is above a threshold. Another example is that additional measurements are conducted at a location where the measurement data shows an unexpected degree of variation or a structure of higher interest. Moving the platform and the trolley in a starting position can be used to indicate that the energy storage on the platform is empty and therefore such commands can be issued in response to sensor data indicating a low power status.

In one embodiment of the damage assessment device the microcontroller, especially the microcontroller of the main system, analyses the received data for traces of critical damages and/or determines values of quality parameter. Examples of such quality parameters are a number and a mean or maximum depth of dents in the scanned region. The same microcontroller controls the wireless transmitter to send a result, the values of quality parameters and/or a virtual representation of the scanned region including the sensor measurement data to an external control station.

The scanned region is preferably the inspection surface or a part of it.

Preferably, the main system evaluates the data in such a way that the results transferred to the external control station need no further evaluation and standard viewing software is sufficient for accessing these results.

For example the results can be image files displaying the inspection surface in the surface-based coordinate system showing virtual representation of the scanned region which is color-coded to display measurement results of a non-destructive testing at the place where they were obtained. The results can also be a statistic about the size distribution of detected dents, the distribution of measurement data of the non-destructive testing or characteristic numbers describing such distributions such as maximum and minimum values and different means. The results can be warnings, issued when thresholds in the measurement data or in the number of detected defects or dents or in one of the quality parameters are crossed.

Preferably, the main system provides the external control station on request with the data on position and measurement results at this position and/or with data describing the status of the flexible guide rail system and preferably also of the sensors mounted on its platform.

This has the advantage that the requirement on the software running on the external control station are low and therefore compatibility with external control stations is simplified. Further, the data rate to be transmitted between external control station and main system is low.

In another embodiment, the main system provides an external server with the data on position and measurement results at this position and/or with data describing the status of the flexible guide rail system and preferably also of sensors mounted on its platform. The server analyses the received data for traces of critical damages and/or to determine values of quality parameter. Preferably examples of such quality parameters are a number and a mean or maximum depth of dents in the scanned region. The server provides the result, the values of quality parameters and/or a virtual representation of the scanned region including the sensor measurement values to an external control station.

This embodiment has the advantage that the computing power needed for the data analysis can be provided by a computer which has less strict requirements on power consumption, size and weight than the main system.

In one embodiment the main system can only receive certain commands from an external control station. Preferably, these commands are commands for executing predefined programs or single measurements, for returning desired data or datasets, for choosing a predefined measurement process or to set parameters for a predefines measurement process.

Analyzing the data already on the trolley or on a specialized server and therefore with a dedicated hardware minimizes the risk of undocumented changes to the software. This is especially true when the list of commands accepted by the main system is restricted and if physical access to the hardware is necessary to perform changes to the software.

A transport case for a trolley with a sensor mounting carrying a sensor comprises fixing means to fix the supporting boxes in a well-defined position with respect to the transport case while allowing the platform with sensors mounted on it to move along the bridge. The transport case comprises one or more reference standards such that a calibration measurement can be conducted while the supporting boxes are fixed by the fixing means. Preferably, there is a defined distance between the fixing means and the reference standard such that the reference standard can be used to calibrate a depth sensor.

Preferably, the transport case comprises support means to support the platform with the sensors mounted on it when the platform is in a transport position.

Preferably, the transport case is further equipped with charging means to change the energy storages of the supporting boxes and of the platform when the supporting boxes are fixed to the fixing means and when the platform is in a transport position. Some or all charging can be realized by inductive charging.

Preferably, the trolley is equipped with a switch to start a calibration procedure. Preferably, a pre-measurement calibration and a post-measurement calibration can be done.

Preferably, a calibration procedure starts when opening and closing the transport case. When opening the case, a pre-measurement calibration is done while when closing the case a post-measurement calibration is done. In order to start the calibration procedure when opening or closing the transport case, the lid of the transport case can be equipped with a protrusion which pushes a button on one of the supporting boxes and pushing respectively releasing this button triggers the calibration procedure. Preferably, the calibration results are used by the main system to calibrate the measurement results.

The pre- and post-measurement calibration can be compared and in the case of significant differences, the user is either asked to repeat the scanning of the inspection surface or the mean of the calibration values is used or an interpolation between the two calibrations is constructed which allows to estimate calibration values for each point in time of interest in between the pre- and the post-measurement calibration.

In one embodiment, only a pre-measurement calibration is used to calibrate the data or only a post-measurement calibration is used to calibrate the data.

Preferably, the main system starts the data analysis and evaluation once the post-calibration is finished and therefore during a time at which the trolley is fixed in its transport case. Preferably the transport case is made of a material which is transparent to the wavelength of the wireless transmitter of the main system. Preferably the transport case is at least partially transparent to visible light to enable the user to see if the calibration process happens.

Preferably the transport case comprises further fixing means to fix the support beams and/or the rails, especially the guiding rails and the inserts, to the transport case.

In one embodiment, a reference standard is mounted to one of the support beams and for calibration purposes the trolley can move on the rails in a region where the sensors measure the reference standard.

In one embodiment, a reference standard is provided by itself and to conduct a calibration the trolley is simply placed onto the reference standard and a calibration routine is started.

In one embodiment, a packed damage assessment device comprises a transport case according to any one of the above mentioned embodiments, a trolley with a sensor mounting carrying a sensor fixed to the platform fixed inside the transport case and a flexible guide rail system according to any one of the above mentioned embodiments.

In one embodiment, a packed damage assessment device comprises a transport case according to any one of the above mentioned embodiments and a damage assessment device, wherein the trolley with the sensor mounting carrying a sensor fixed to the platform is fixed inside the transport case.

Preparing an inspection using the damage assessment device is done by executing the following steps:
  a) Mounting the flexible guide rail system on the inspection surface
  b) Switching the trolley (4) on, whereby the trolley (4) establishes preferably a contact with an external control station (14);
  c) Placing the trolley (4) onto the rails (2).

Because of the magnetic attraction between the rails and the magnetic wheels on the trolley, there is no need to connect the trolley in a special way to the guide rail system. This makes the preparation of an inspection particularly easy and allows it to waive the need for a special training or education for this step of an inspection. For example, a specialist at a remote location can simply ask any one of the local staff on an airport to mount the flexible guide rail system and to place the trolley on it.

In the case of a flexible guide rail system using displacement sensors or a positioning sensor, the trolley is guided along the rails by the control of the wheel-motor which considers the sensor signals such that the treads of the wheels stay on the running surface of the rails.

In the case of a flexible guide rail system with rails with u-shaped cross—section, when the trolley is placed onto the rails its wheels are guided by the rails and their treads are on the inner bottom of the u-shape of the rails.

In one embodiment, the first support beam is mounted to the inspection surface before the second support beam is connected to the rails.

In one embodiment, the first and the second support beam are first connected to the rails and the system comprising both support beams and both rails is mounted to the inspection surface essentially at once.

In one embodiment, the rails and the support beams are already connected and the system comprising both support beams and both rails is mounted to the inspection surface essentially at once.

Preparing an inspection can be done by an unskilled person.

Preferably, the trolley is placed on a reference standard which is preferably located in the transport case for a calibration, especially a pre-measurement calibration. Preferably, this is done before the trolley is placed on the rails.

Preferably the trolley is removed from the rails after the inspection is finished and it is placed in the transport case. Preferably the trolley is placed on a reference standard which is preferably located in the transport case for a calibration, especially a post-measurement calibration.

In one embodiment, the calibration is started by pressing a button on one of the supporting boxes.

A damage assessment procedure is an inspection focusing on possible damages and dents. In one embodiment, preparing an inspection which uses the damage assessment device is done by executing additionally the following steps:

a) Mounting the first support beam to the inspection surface using adhesion means, preferably suction cups.

b) Preferably, connecting the rails to the first support beam.

c) Preferably, connecting the second support beam to the rails.

d) Mounting the second support beam to the inspection surface, using adhesion means, such that the rails are tightened between the support beams.

In one embodiment of the method for preparing an inspection, the mounting the flexible guide rail system on the inspection surface is done by executing additionally the steps of a) Mounting the first support beam which is fixed to the rails to the inspection surface. Preferable, the first support beam is mounted to the inspection surface by fixing sections of both rails which are closest to the first support beam onto the inspection surface. In this case, the respective sections of the rails are preferably fixed to the inspection surface by the use of an adhesive.

b) Preferably, exposing or applying an adhesive to the sides of the rails intended to be placed on the inspection surface, such that the rails can be fixed to the inspection surface, c) Beginning at the first attachment region of the first support beam, placing the first rail supported by the first attachment region onto the inspection surface.

d) Beginning at the second attachment region of the second support beam, placing the second rail supported by the second attachment region onto the inspection surface e) Mounting the second support beam to the inspection surface. Preferable, the second support beam is mounted to the inspection surface by attaching it to both rails, preferably by the use of an adhesive.

In a preferred embodiment, the rails are equipped with Velcro tape consisting of two parts connected to each other via the Velcro system and wherein the other side is equipped with an adhesive layer protected by a protection layer which can be peeled off to expose the adhesive. In order to mount the flexible guide rail system, the protection layer of both rails is peeled off in the region below the first support beam. The first support beam is pushed against the inspection surface whereby the exposed adhesive mounts the Velcro tape, the rails fixed to the Velcro tape and the first support beam mounted to the rails to the inspection surface. The user continues to peel off the protection layer of one of the rails pushing the rail, beginning at the first support beam onto the inspection surface. Once the user has reached the end, he continues with the second rail, again at the first support beam. As the rails are bendable in only one direction, the rails run parallel to each other. However, because the inspection surface may be curved differently along the first and the second rail, the section along which the distance between the two rails equals the scanning distance can have a different length measured along the first rail compared to the length measured along the second rail. In order to mount the second support beam correctly, the user may hold it parallel to the first support beam and follow the rails such that the attachment regions of the second support beam stay above the rails up to the distance where this stops being possible and fix the second support beam to the rails at the last position where the distance between the rails equals the scanning distance.

In one preferred embodiment, the second support beam is used to mount the rails on the inspection surface. Preferably, the second support beam is equipped with a mechanisms to peel off the protraction layer and to push the rails onto the inspection surface while the second support beam is pulled away from the first support beam and pushed against the inspection surface at the same time. In this embodiment, the second support beam is by itself guided by the rails. In this way, a correct placement of the second support beam is automatically ensured, as the mechanism will be blocked when a greater distance between the two rails is needed. In a preferred embodiment, the end of the rails are equipped with an end stop or fixed to the second support beam such that the mechanism blocks when the end of at least one the rails is reached.

Conducting an inspection with a damage assessment device is done by executing the steps of a) Instructing a person to prepare or preparing an inspection of an inspection surface.

b) Starting a scanning process by issuing a suitable command from the external control station.

c) Receiving the results and possible warnings from the damage assessment device.

d) Reviewing the results in order to decide if further measurements are needed and if this is the case, instructing the damage assessment device by sending appropriate commands from the external control station.

e) If no further measurements are needed, receiving the final results and reviewing them.

In one embodiment, a calibration is started by issuing a suitable command from the external control station once the trolley is placed on the reference standard.

Conducting an inspection is preferably done by a skilled and certified person. Conducting an inspection is preferably done remote controlled.

For example, an aircraft located at a small airport in a first country can be inspected by an assisting person who is preparing the inspection or damage assessment procedure at the aircraft and by conducting the inspection remote controlled by a certified person located in an office in a second country.

In one embodiment, starting a scanning process is done by triggering it directly on the trolley. In this case the damage assessment device can save the measurement data in an internal memory such that it can be transferred to an external device at a later point in time, for example by connecting a cable. This embodiment has the advantage that no wireless connection has to be established. In one embodiment, the damage assessment device comprises wireless transmitters but in addition also an interface to connect a cable and a switch to trigger calibration and/or scanning routines on the device. This damage assessment device can be used in environments where wireless connections are possible as well as in environments where wireless connections should be avoided or cannot be established.

A scanning process conducted by the damage assessment device comprises the steps of a) Receiving a command to start a scanning process.

b) Moving the platform in one direction until a proximity sensor detects a predefined distance to one of the supporting boxes.

c) Moving the wheels of the trolley in one direction until at least one proximity sensor detects a predefined distance to one of the support beams.

d) Moving the platform along the beam and the trolley along the rails in a chosen scanning pattern while capturing measurement data, X-position data and Y-position data.

e) Combining the data in dataset associating the measurement data with a set of position data indicating the position of the measurement.

The scanning pattern can consist of starting from a position where the trolley is at the first support beam and the platform is at the first supporting box. Then the platform moves from one supporting box to the other. Afterwards the trolley is moved a short distance. These movements are repeated until the other support beam is reached.

The scanning pattern can consist of starting from a position where the trolley is at the first support beam and the platform is at the first supporting box. Then the trolley is moved from one support beam to the other. Afterwards the platform is moved a short distance towards the other supporting box. These movements are repeated until the other supporting box is reached.

The scanning pattern can consist of starting from a position where the trolley is at the first support beam and the platform is at the first supporting box. Then the platform is moved from one supporting box to the other while the trolley is moved at the same time in either the same speed or in a speed different from the one of the platform. Once the platform reaches one supporting box, it changes the direction of its motion and when the trolley reaches one of the support beams it changes its direction of motion. The motion is stopped once the starting position is reached, in which case the platform is moved to a position which was not already measured and the movement is continued until the inspection surface is covered with the desired spatial resolution.

In one embodiment, the sensor and/or the position data are calibrated with calibration data obtained during a calibration.

In one embodiment, the dataset is checked for consistency and completeness and if inconsistent or incomplete data is found, by moving the wheels and the platform, the sensors of the trolley are moved to the respective location and the measurements are repeated.

In one embodiment, the measurement data is reduced by removing large scale curvature noticeable in a depth measurement along the bridge, and therefore in the x-direction. In one embodiment the measurement data is analyzed.

In one embodiment, the dataset, especially in its reduced and calibrated form and/or the results of the analysis are transmitted to the external control station.

The flexible guide rail systems and the damage assessment device are in one embodiment used to determine the properties of an aircraft surface, preferable for evaluation and inspection of damage caused by, for example bird strike or collision with a ground vehicle. The damage assessment device is used in one embodiment to evaluate and inspect the damage on an aircraft surface remote controlled. The remote control is an external control station. In these cases, a part of the aircraft surface is the inspection surface. Preferably the aircraft surface is made of non-ferromagnetic material.

The flexible guide rail systems with a sensor mounted to the platform are in one embodiment used to determine the properties of an aircraft surface, preferable for evaluation and inspection of damage caused by, for example bird strike or collision with a ground vehicle. The flexible guide rail systems with a sensor mounted to the platform is used in one embodiment to evaluate and inspect the damage on an aircraft surface remote controlled. The remote control is an external control station. In these cases, a part of the aircraft surface is the inspection surface. Preferably the aircraft surface is made of non-ferromagnetic material.

Other advantageous embodiments and combinations of features come out from the detailed description below and the entirety of the claims.

BRIEF DESCRIPTION OF THE DRAWINGS

The drawings used to explain the embodiments show:

FIG. 3b Isometric view of the guiding-length-section of the guide rail comprising guide-rail elements FIG. 4a Isometric view of the bridge with the sensor mounting for a non-destructive testing sensor and the depth sensor.

FIG. 8b A cross-section of the rail according to FIG. 8a

In the figures, the same components are given the same reference symbols.

DETAILED DESCRIPTION

Figure 1A:
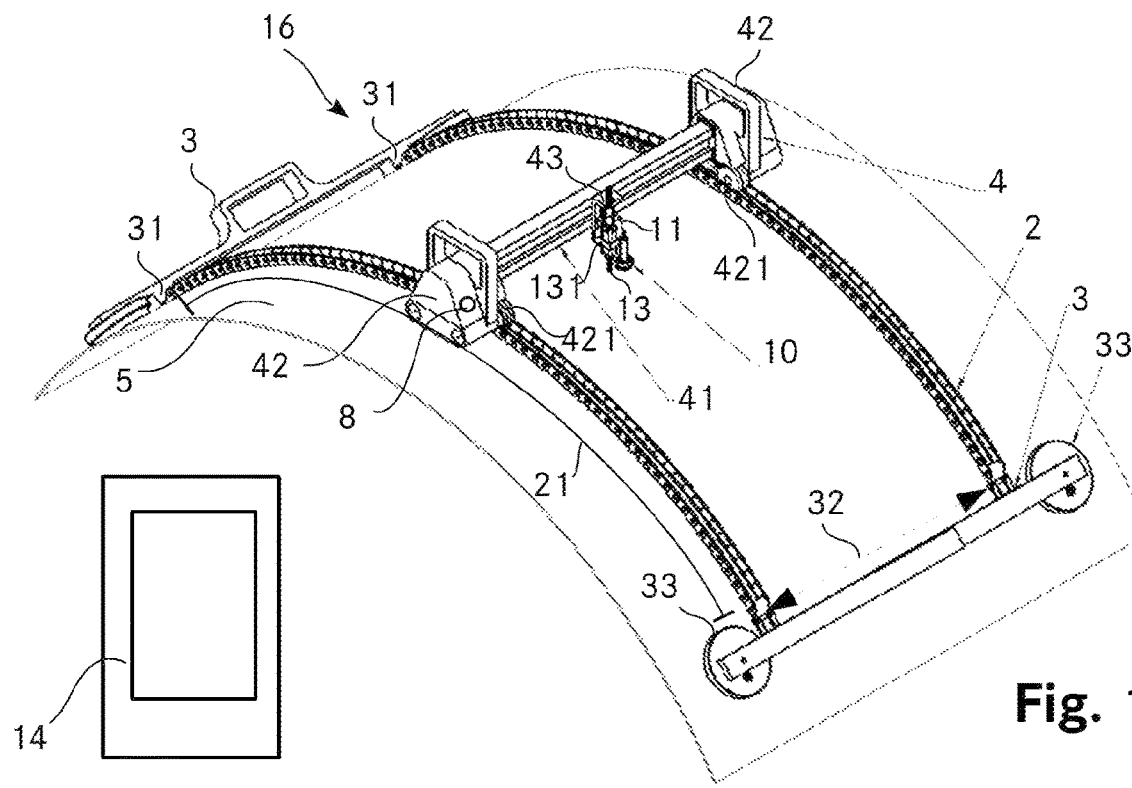
FIG. 1 a Isometric view of the entire damage assessment device (DAD).
FIG. 1b Isometric view of the single components of the flexible guide rail system FIG. 2 Cross-section of one side of the trolley with the wheel which is connected to the wheel-motor and which is permanent magnetic FIG. 3a Isometric view of the attachment region of the support beam and the rail connected to it.
Figure 4B:
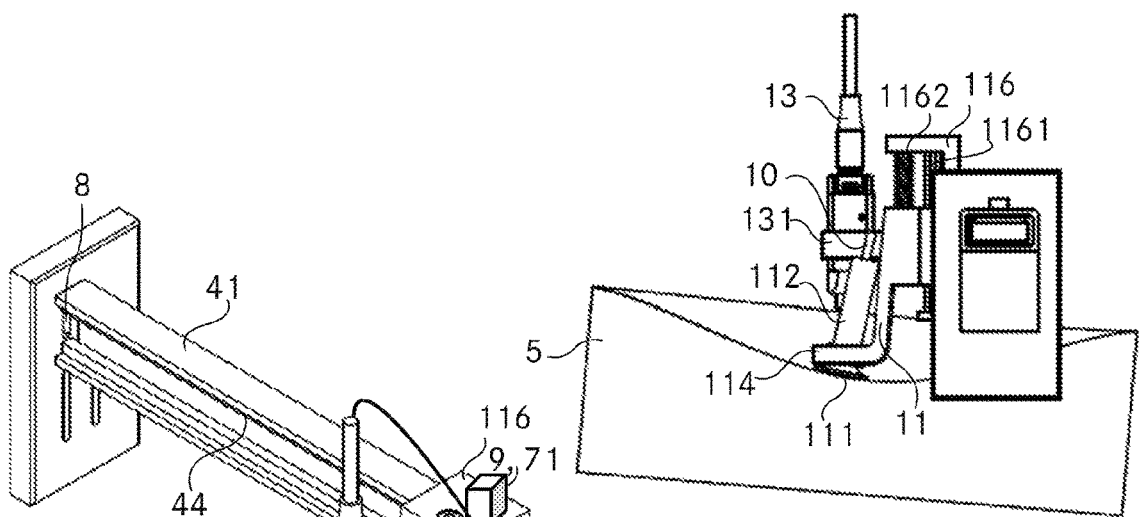
FIG. 4b Sectional view of the bridge showing the principle aligning mechanism of the sensor mounting for the non-destructive testing sensor.
Figure 4A:
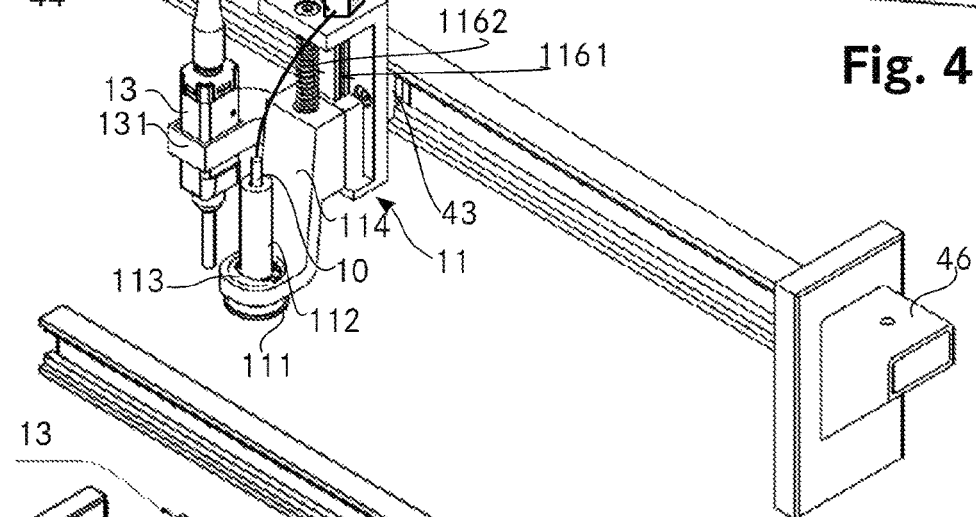
FIG. 4c Isometric view of the detailed components of the sensor mounting for the non-destructive testing sensor and the mounting for the depth sensor.

FIG. 1a shows the isometric view of the entire damage assessment device, in short DAD, 16. The trolley 4 comprises a bridge 41 with the platform 43 carrying the non-destructive testing sensor 10 and the depth sensor 13. On the platform 43 two different kind of sensors are mounted; the sensor mounting 11 is used for supporting the non-destructive testing (NDT) sensor 10, and the depth sensor holder 131 is used for supporting the depth sensor 13. Both types of sensors are mounted to the platform 43. The platform 43 is supported within the bridge 41 and is movable from one side to the other side of the bridge 41. By connecting the platform 43 via a toothed belt 44 to a platform-motor 46, which is an electrical stepper motor, the platform 43 with the attached sensors 10, 13 can be moved from the one side of the bridge 41 to the other side. The toothed belt 44 and the platform-motor 46 are occluded in FIG. 1*b* by the bridge 41 respectively the housing of one of the supporting boxes 42 and are illustrated in FIG. 4*a*.

The trolley 4 comprises further two supporting boxes 42 which carry the bridge 41. Each of the supporting boxes 42 comprises two magnetic wheels 421. One of the magnetic wheels 421 of each supporting box 42 is connected to a gear box and a wheel-motor 45, which is an electrical motor, driving the magnetic wheel 421. The magnetic wheels 421 are permanent magnetic wheels.

In the embodiment shown in FIG. 1*a*, one of the supporting boxes 42 is equipped with a proximity sensor 8. All electronic devices such as an energy storage 9 in the form of a battery, a microcontroller 73 and wireless transmitter 71 are in one embodiment placed inside the housing of one or both the supporting boxes 42. They and the wheel-motor 45 are therefore not visible in FIG. 1*a* but in FIG. 2.

Figure 5:
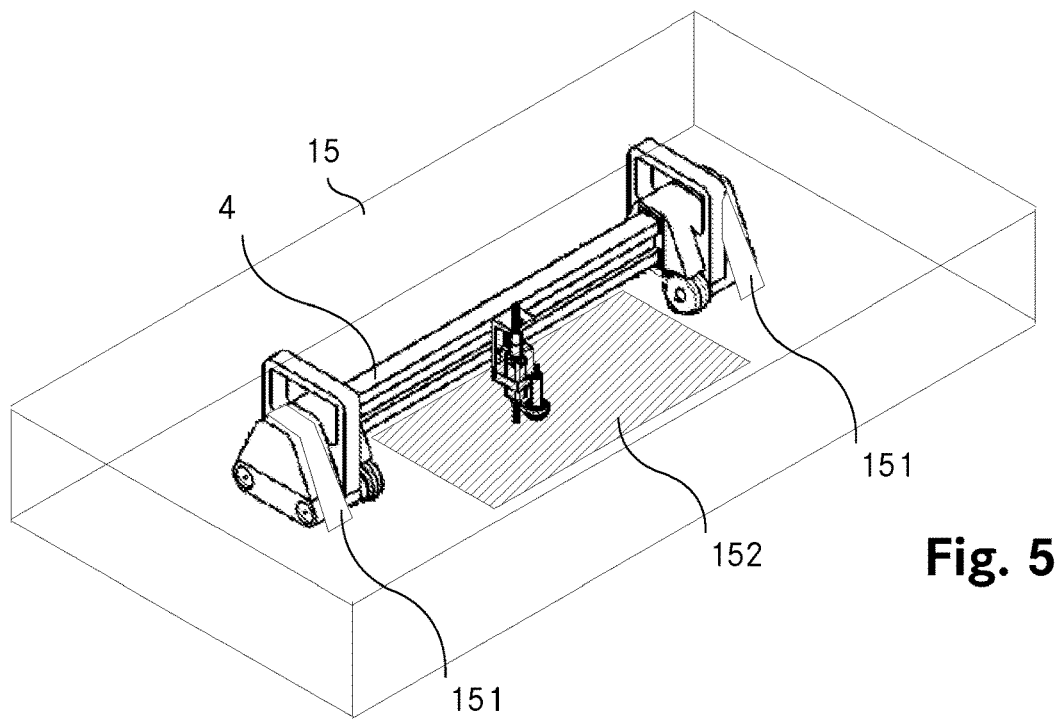
FIG. 5 Isometric view of a transport case with a trolley fixed inside

When not in use, the trolley 4 is disconnected from the rails 2 and stored separately in a transport case 15 as illustrated in FIG. 5. For the inspection process the trolley 4 will be stick to the rails 2 by putting the magnetic wheels 421 into the rails 2 and on the ferromagnetic part of them. By activating the wheel—motors 45 of both supporting boxes 42, the trolley 4 moves along the rails 2. This movement can be controlled by the external control station 14, which is preferably a wireless remote-control unit, or the movement is fix defined within the motor control unit which is preferably integrated in the main system 7.

The damage assessment device comprises further two rails 2, which guide the magnetic wheels 421 of the trolley 4. The rails 2 are fixed to support beams 3. The support beams 3 are mounted to a curved inspection surface 5 by adhesion means 33. The adhesion means 33 are vacuum suction cups located at the ends of the support beams 3. The support beams 3 have an elongated shape and are equipped with handles. Each support beam 3 comprises two attachment regions 31 which are arranged in a scanning distance 32 from each other.

The bridge 41 has a length which equals essentially the scanning distance 32.

In addition, FIG. 1*a* shows an external control station 14 which can send commands to the damage assessment device 16 and which can receive data, results and warnings from the damage assessment device 16.

The rails 2 are tightened between the two support beams 3. The rails 2 comprise a guiding-length-section 21. This guiding length-section 21 is in this embodiment everything of the rail 2 except for coupling means on each end. Along the guiding-length-section 21, the rails 2 have a u-shaped cross section. The bottom of the guiding-length-section 21 is at least partially ferromagnetic. Therefore the magnetic wheels 421 are attracted to the rails 2 by magnetic forces. The rails 2 are mounted to the support beams 3 which are mounted to the curved inspection surface 5. Therefore, the trolley 4 can follow the curved inspection surface 5 even if the inspection surface 5 is made of a non-ferromagnetic material such as composite or aluminum.

In order to tighten rails 2, a mechanism such as for example a second ratchet may integrated between the end of the guiding-length-section 21 of the rails 2 and the support beam 3. The second ratchet is preferably part of the attachment region 31 of the support beam 3. However, it could also be part of the rail 2.

The rails 2 are flexible in the sense that they can bent along one direction perpendicular to the extent of the support beams but preferably not along a second direction parallel to the support beams. This ensures that the rails 2 run essentially parallel to each other in a projection on a plane comprising a section of the bottom of one of the rails.

Figure 1B:
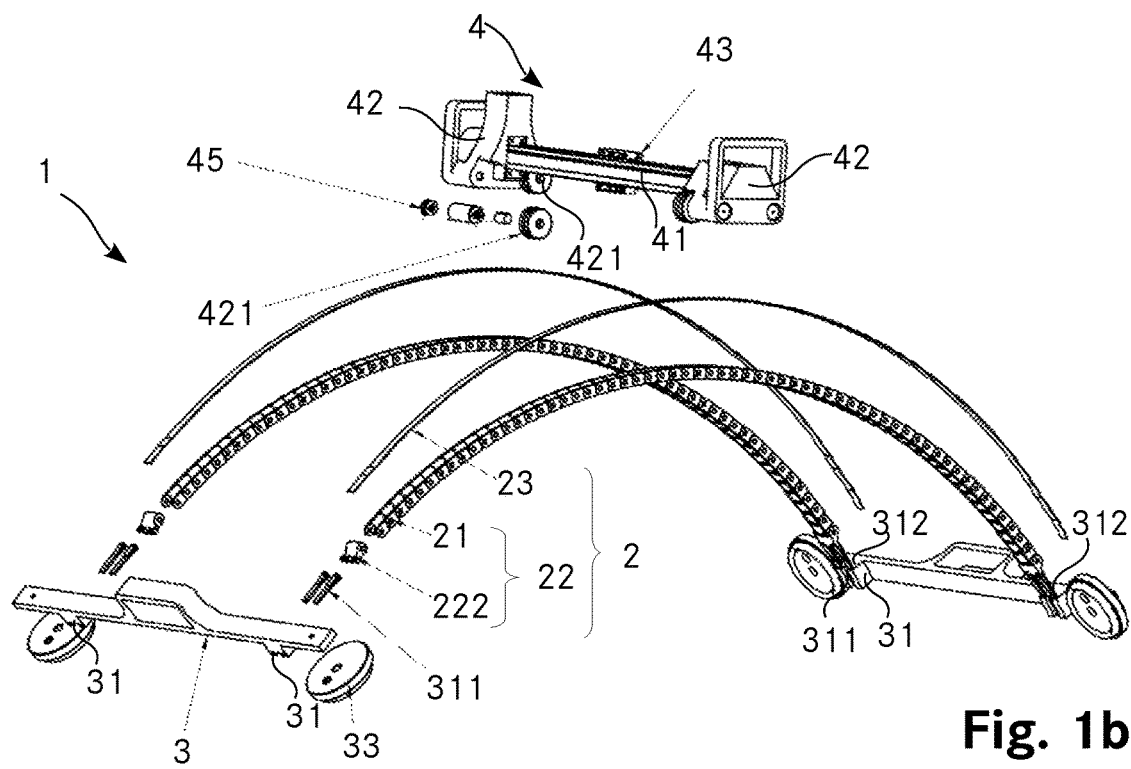

FIG. 1*b* is an isometric view of the flexible guide rail system 1 with its single components: There is the trolley 4 comprising two supporting boxes 42 supporting a bridge 41 carrying a platform 43. Each of the supporting boxes 42 comprises two magnetic wheels 421. One of the wheels 421 of each supporting box 42 is powered by a wheel-motor 45.

The rail 2 consists of a flexible guide rail 22 which is able to adapt itself to the contour of the aircraft structure and a ferromagnetic insert 23 on the inner bottom of the flexible guide rail 22. The guide rail 22 comprises a guiding-length-section 21 and guide rail attachment elements 222 at both ends of the guiding-length-section 21. The guide rail attachment elements 222 comprise a first ratchet which can hold the insert 23. The insert 23 is a ferromagnetic steel band in this embodiment.

The guide rail attachment elements 222 are connectable to guide rail attachment means 311 of the support beams 3. As explained above, the length of the section of the insert 23 between its end and the first ratchet should equal the length of the distance between the first ratchet and the insert attachment means 312. But the length of this section of the insert 23 depends on the setpoint-shape of the rail which depends on the curved inspection surface 5 to be inspected. Therefore, it is desirable to provide a length-adaptable connection between the guide rail attachment elements 222 and the guide rail attachment means 311. Such a length adaptable connection is preferably a second ratchet or a connection comprising an elastic band. In the embodiment of FIG. 1*b*, the guide rail attachment means 311 comprise an elongated, structured part with teeth while the attachment region 31 of the support beam 3 comprises an opening with spring loaded pawl inside which allows the structured part to be pushed through the opening but inhibits it to be pulled out again without further actions from a user. In the embodiment of FIG. 1*b* the insert attachment means 312 are simply an indentation suitable to insert the tip of the insert 23. However, it is also possible to simply provide a solid surface on the support beam at the place where the insert 23 contacts the support beam 3 as insert attachment means 312.

Each support beam 3 is stick by two attached adhesion means 33 to the inspection surface 5, which could be a curved aircraft structure.

The function of the rails 2 is to connect the trolley 4 with the curved inspection surface 5, e.g. aircraft structure, and guide it over the inspection surface 5. This is done by the magnetic attraction between the permanent magnetic wheels 421 and the ferromagnetic insert 23 on the inner bottom surface of the guide rail 22. That means, first the guide rail 22 and the insert 23 have to be installed on the curved surface 5 and in a second step the trolley 4 is applied to the rails 2 by inserting the two magnetic wheels 421 of each supporting box 42 into the rails 2 until the magnetic force attracts the magnetic wheels 421 and therefore the trolley 4 to the ferromagnetic insert 23.

When the trolley 4 is mechanically connected to the rail 2, the trolley 4 can be moved along the rail 2 in both directions by driving the magnetic wheels 421.

FIG. 2 is a diagram showing the cross-section of one side of the trolley 4 with the wheel 421 which is connected to the wheel-motor 45 and which is permanent magnetic. The FIG. 2 shows part of the bridge 41 and the supporting box 42 and the guide rail 2.

In the cross-sectional view, the supporting box 42 appears as essentially rectangular element with three sections:

In the lower third of the rectangle, there is the wheel-motor 45 connected to a gear box which drives an axis on which the magnetic wheel 421 is mounted. The magnetic wheel 421 is a permanent magnetic wheel. Close to the axis, it comprises a non-ferromagnetic insert which is surrounded by two rings made of permanent magnetic material 4212, arranged concentric to the axis and parallel to each other. Between the permanent magnetic material 4212 there is a non-ferromagnetic insert which is covered by a friction tape forming an anti-slip surface 4211.

The magnetic wheel 421 is placed in a guide rail 22 which has a u-shape in the cross-section. This u-shape has an inner u-shape width 211, which is the distance between its side walls and it has an inner u-shape height 212, which is the distance between the upside of the insert 23 and the top of the side walls measured perpendicular to the bottom of the guide rail 22. When speaking of "in", "inner" or "inside" the rail 2, this refers to the volume between the side walls. The insert 23 is placed on the inner bottom of the guide rail 22. On the outer bottom of the guide rail 22, there is an adhesive tape 6 in this embodiment. The outer bottom of the guide rail 22 is placed on the curved inspection surface 5. An adhesive tape 6 is fixed to it. This is an additional support to prevent the rails 2 from slipping on curved inspection surface 5, which can be an aircraft structure.

The upper two thirds of the rectangle are divided in a right and a left half. The left haft shows the cross-section of a pocket comprising the main system 7 and an energy storage 9. The main system 7 comprises a wireless transmitter 71, a memory 72 and a microcontroller 73.

The right half shows the cross-sectional view of the support for the bridge 41. In the case of the supporting box 42 shown here, the bridge 41 is simply placed in an opening with a shape complementary to the bridge 41.

FIG. 3a is an isometric view of the attachment region 31 of the support beam 3 and the guide rail 22 and the insert 23.

The guide rail 22 is constructed from guide-rail elements 221 and it ends with a guide rail attachment element 222. The guide rail attachment element 222 comprises a first ratchet for interaction with the insert 23. In comprises further openings to connect with the guide rail attachment means 311. The guide rail attachment means 311 form a second ratchet together with a suitable opening in the attachment region 31 of the support beam 3. The guide rail attachment means 311 allows to vary the distance between the attachment region 31 and the guide rail attachment element 222. In the view shown in FIG. 3a, the distance is chosen such that the insert 23, fixed by the first ratchet on the guide rail attachment element 222, contacts the insert attachment means 312.

Assuming that the other end of the rail 2 is connected in the same way to the other support beam 3, the insert 23 ensures a minimum length between the support beams 3 measured along the rail 2 and the guide rail 22 and the guide rail attachment means 311 ensures a maximum length between the support beams 3 measured along the rail 2. As this minimum length and this maximum length are set to be the same when installing the support beams 3, insert 23 and guide rail 22 as explained above, the length of the rail 2 is fixed to the length of its setpoint-shape. By choosing a guide rail 22 which changes its length when changing its bending and by placing the guide rail 22 on an inspection surface, the shape of the rail 2 is essentially fixed to its setpoint-shape.

FIG. 3b shows an embodiment of the guide rail 22 in more detail in an isometric view. The guide rail 22 comprises essentially identical guide rail elements 221. The guide rails elements 221 comprise a bottom part and side walls and have a u-shaped cross-section. The side walls extend perpendicular to the bottom part. The bottom part is flat. Each side wall comprises a first coupling mean 2211a in the form of a round protrusion and a second coupling mean 2211b in the form of an opening. The first and the second coupling means 2211a, b are arranged such that they can interact and form a pivot which is located above the bottom part. In order to allow a bending where the bottom part is closer to the center of the curvature than the pivots, the bottom parts are located, in longitudinal direction, in the middle between the first and the second coupling means 2211a and 2211b but have an extend which is smaller than the distance between the first and the second coupling means 2211a, b: A small extend of the bottom part allows a small bending radius while a large extend of the bottom part increases the smallest possible bending radius.

Therefore the longitudinal extent of the bottom part can be chosen to be larger than the scale of dents to be detected but smaller than the scale of the basis structure. The basis structure is the ideal structure of inspection surface.

Figure 4C:
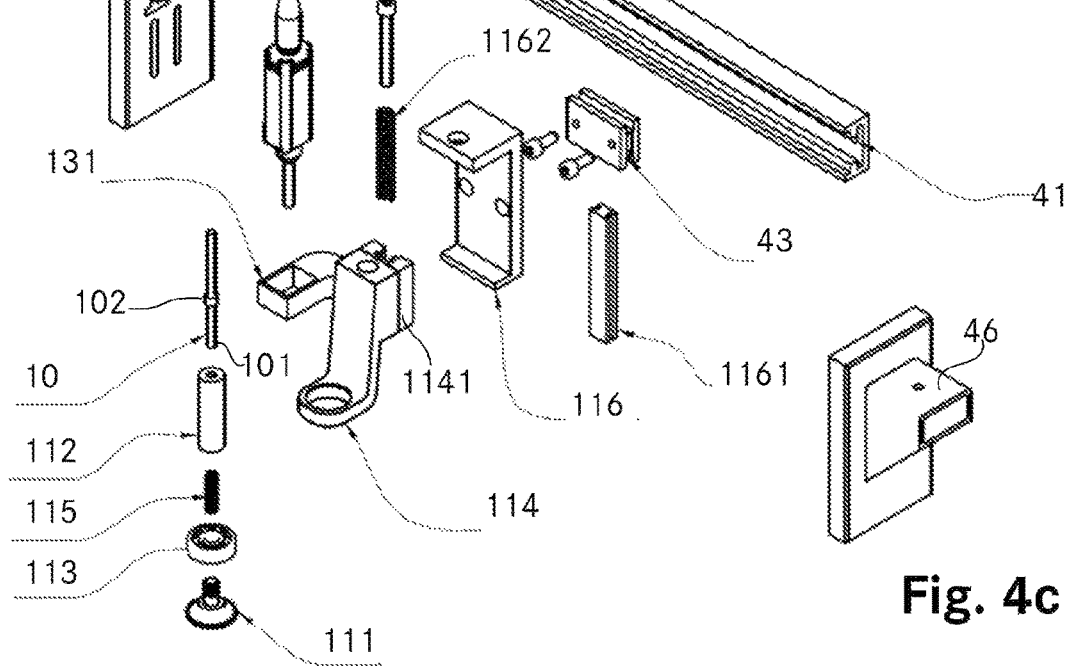

FIG. 4a is an isometric view of the bridge 41 with the sensor mounting 11 for the non-destructive testing sensor 10 and depth sensor holder 131 the depth sensor 13. FIG. 4b shows a side view of the situation. FIG. 4c shows an isometric view of the different components involved.

The bridge 41 is on both sides supported by endplates which are part of the supporting boxes 42 of the trolley 4. In the embodiment at hand, one endplate comprises a proximity sensor 8 detecting the proximity of the platform 43 carrying the sensor mounting 11 and the depth sensor holder 131.

The bridge 41 has a C-shapes profile with additional protrusions extending along the profile forming a rail for the platform 43. In addition, the bridge 41 guides a toothed belt 44 which is powered by a platform-motor 46 located in one of the endplates. The toothed belt 44 is connected to the platform 43. The platform 43 is shaped in such a way that is can be guided by the bridge 41.

The sensor mounting 11 for supporting different kinds of Non-Destructive Testing (NDT) sensors 102 can keep the non-destructive testing sensor 102 always perpendicular and in direct contact to the inspected surface even when the surface is uneven, rough or bumpy due to dents, damages or construction related. The functionality of the sensor mounting 11 is as follows: The sensor head 101 of the non-destructive testing sensor 10 is fastened into the opening of the circular base plate 111 and fixed by the screwable sleeve 112 together. The spring 115 inside the screwable sleeve 112 presses the sensor head 101 of the non-destructive testing sensor 10 against the inspection surface. The three-dimensional bearing 113 is fixed between the base plate 111 and the screwable sleeve 112 and it ensures that the non-destructive testing sensor 10 longitudinal axis is always perpendicular to the inspection surface. The three-dimensional bearing 113 in turn is mounted in the circular opening of the sensor holder 114. In order to adjust the non-destructive testing sensor 10 to different height of the inspection structures the sensor holder 114 is movably mounted to the bracket 116 via the sliding rail 1161. Therefore the sensor holder 114 comprises a sliding rail guidance 1141 shaped in a complementary way to the sliding rail 1161. The sliding rail 1161 is arranged perpendicular to the bridge 41. The spring and bolt combination 1162 will ensure that the sensor holder 114 presses the non-destructive testing sensor 10 on the inspection surface with a defined force. The bracket 116 is connected via two screws to the platform 43 which by itself is guided within the bridge 41. The task of the platform 43 is to move the sensor mounting 114 with the non-destructive testing sensor 10 and the depth sensor 13 along the bridge 41.

In FIG. 4a, there is in an energy storage 9 and a wireless transmitter 71 provided on the upper side of the bracket 116. Cables connect the depth sensor 13 and the non-destructive testing sensor 10 with the energy storage 9 and the wireless transmitter 71 such that the energy can be provided to the sensor and such that data can be transmitted to the main system 7.

Whenever it comes to a damage or a dent on an aircraft surface the dimension of the damage or dent must be evaluated. Therefore the damage assessment device is preferably further equipped with a depth sensor 13. The depth sensor 13 is fixed in the separate depth sensor holder 131 which by itself is fixed to the bracket 116. The depth sensor 13 is arranged such that it points directly downwards, which is a direction perpendicular to the extent of the bridge 41.

FIG. 5 is an isometric view of a transport case 15 with a trolley 4 fixed inside. The transport case 15 comprises fixing means 151 which fix the trolley 4 is such a way that the platform 43 can move along the bridge 41. The transport case 15 comprises further a reference standard 152 which is arranged such that the sensors mounted on the platform 43 pass over it when the platform 43 moves along the bridge 41 and conducts calibration measurements.

Every time a non-destructive testing inspection is required a reference measurement on a so-called reference standard 152 is preferably carried out before and after the actual non-destructive testing inspection. This is called pre- and post-calibration. The material of the reference standard 152 is preferably comparable with the material of the inspected structure. Additionally, artificial damages and dents which are comparable with the expected damages and dents are preferably integrated on the reference standard 152. In one embodiment, the damage assessment device is able to carry out the pre-, and post-calibration fully automated. In order to do so, the trolley 4 is stored in the transport case 15. The reference standard 152 is integrated in the transport case 15 in the way that the sensor head 101 of the non-destructive testing sensor 10 is placed on the reference standard 152. For the calibration procedure the main system 7 starts the calibration process by autonomous sliding the non-destructive testing sensor 10 over the reference standard 152 and either adjusts the required parameters of the non-destructive testing sensor 10 and/or stores the information for calibration the data received from the non-destructive testing sensor 10 during a data reduction step. The above described procedure can be used for pre-, and post-calibration of the non-destructive testing sensor 10.

Figure 6:
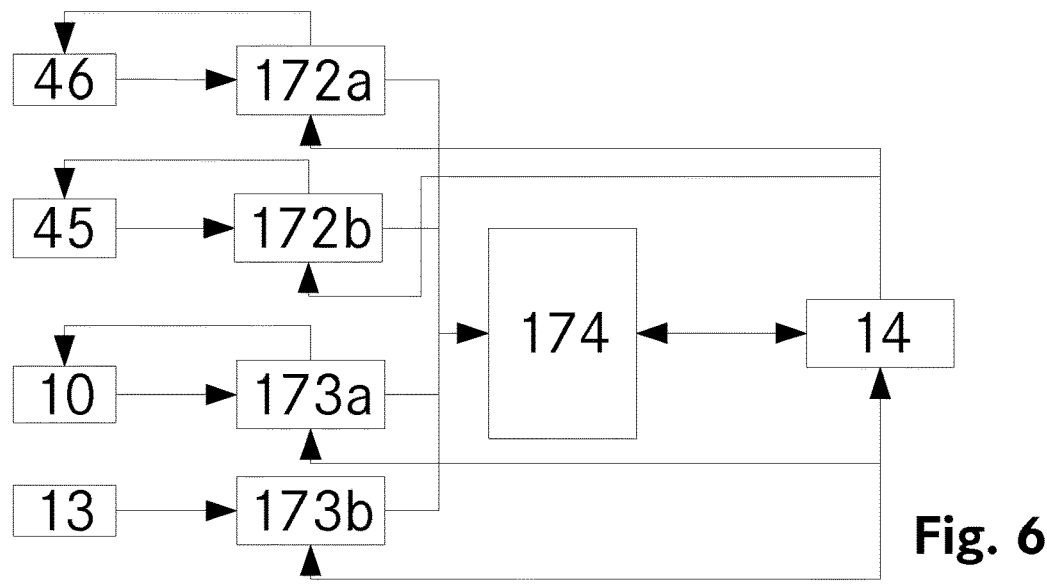
FIG. 6 Flowchart of the data and command flows between the different components of the damage assessment device and the external command centre.

FIG. 6 is a flowchart of the data and command flows between the different components of the damage assessment device 16, in the following DAD.

In one embodiment, the main system 7 comprises the necessary hard- and software components for,
The data processing,
The data visualization,
Remote controlling the damage assessment device 16 and the sensors 10, 13,
Analysing the measured data,
Driving and control the movement of the platform 43 and the trolley 4.

The main system 7 is for example integrated in one of the supporting boxes 42 of the trolley 4. For supplying the main system 7 with electrical power an energy storage 9, preferably a rechargeable electrical power supply, is integrated in the supporting box 42. The main system 7 enables the calculation for the three-dimensional visualization of the measured data.

The main system 7 comprises a signal processing and data visualization unit 174, two units for controlling and position estimation for the x-axis and the y-axis, called X-Axis and Y-Axis unit 172a, 172b, the unit for reading and processing the data measured by the non-destructive testing sensor 10, called NDT Data unit 173a in the following, and the unit for reading and processing the data measured by the depth sensor, called Depth Data unit 173b in the following. NDT Data unit 173a receives the data from non-destructive testing sensor 10. The Depth Data unit 173b receives the data from the depth sensor. The X-Axis unit 172a receives the data from the position sensors of the platform-motor 46. The Y-Axis unit 172b receives the data from the position sensors of the wheel-motors 45. In the following the functionality of the different units within the main system 7 are described.

The task of the Signal Processing and Visualization unit 174 is to process the measured data coming from the non-destructive testing and depth sensor, analyze the non-destructive testing data for possible damage indications and combine the data coming from the non-destructive testing sensor 10, the depth sensor 13 and the position information from the x-axis and the y-axis. Based on the listed data a three-dimensional damage map will be created and visualized. This visualization enables the operator of the DAD to identify a possible damage to the inspected surface and the respective damage position within the three-dimensional visualized depth information about the shape of the inspected surface and possible irregularities caused for example by an impact to the inspected surface.

One of the advantages of the present DAD is its possibility to control the entire inspection process from a remote location. The external control station 14 enables to control the wheel- and the platform motor, via the units for control the x-axis 172a and the y-axis 172b, and to remotely access the information about the three-dimensional map created by the signal processing and visualization unit 174. Furthermore, the NDT Data unit 173a and the Depth Data unit 172a can be remotely controlled, and all needed parameter settings can be done by the external control station 14.

The information about the position of the x-axis and the y-axis are gained by sensors, preferably encoders, mounted to the appropriate axis of the DAD and transmitted to the X-Axis 172a or Y-Axis Unit 172b. The task of both units is to process the received data and transmit this data to the Signal Processing and Data Visualization Unit 174. Further, both units are part of a feedback loop, comparing a measured x- or y-location with a setpoint-value received by the signal processing and data visualization unit 174 or the external control station 14, in order to reach a desired position.

Different types of non-destructive testing can be done by the damage assessment device requiring simply a change of the sensor and the NDT Data unit 173a. Examples of non-destructive testings are eddy current testing, ultrasonic testing, terahertz testing, shearographic testing, visual testing or thermographic testing. The non-destructive testing sensor 10 transmits the measured data to the NDT Data Unit 173a. One task of the NDT Data Unit 173a is to process the received data by calibrating and filtering. Then the NDT Data unit 173a transmit the data to the Signal Processing and Data Visualization Unit 174. The second task of the NDT Data Unit 173a is to generate the needed probing signal for the non-destructive testing sensor 10 based on the respective non-destructive testing method. The probing signal is a signal produced by the non-destructive testing sensor 10 in order to trigger a reaction of the surface which is then measured resulting in the desired measurement data. The NDT Data Unit 173a is further connected to the external control station 14 in order to select the non-destructive testing measurement parameters by the operator from a remote location.

The Depth Data Unit 173b is directly connected to the depth sensor 13 on the DAD 16 and its task is to process the measured depth data for example by filtering and/or calibrating. After processing the data it is transmitted to the Signal Processing and Data Visualization Unit 174. Furthermore, the Depth Data Unit 173b is connected to the external control station 14 and all parameter settings on the Depth Data Unit 173b can be handled by the operator from a remote location.

Figure 7A:
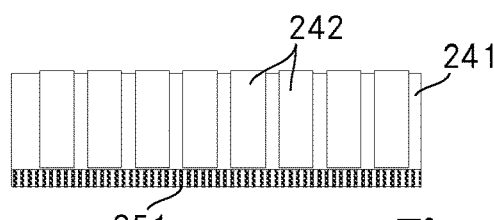
FIG. 7a Close-Up view onto a rail comprising a carrier ribbon and using ferromagnetic tiles to form the running surface FIG. 7a A cross-section of the rail according to FIG. 7a FIG. 8a Close-Up view onto a rail comprising a guide rail and an insert forming the running surface.

FIG. 7a shows a close-up view onto a rail 2 comprising a carrier ribbon 241 and a running surface made of ferromagnetic tiles 242. The ferromagnetic tiles 242 have all an identical, rectangular shape and are arranged in parallel to each other whereby the long sides are adjacent to each other and the short sides form the border of the running surface. The distance between two subsequent tiles 242 and the height of the tiles 242 is chosen in such a way that the curvature of the rail in the downward direction is limited to a desired value. In the embodiment shown here, the curvature of the rail in the upward direction is limited only by the curvature of the carrier ribbon 241. For general inspection surfaces, this property is desirable, as the rail can be stored and transported rolled up while typical inspection surfaces may comprise unexpected dents or holes but rarely unexpected protrusions which need to be crossed by the rails. However, for appliances where the curvature of the rails in upward direction should be limited, too, the tiles can be connected close to their running surface, for example by a thin fabric with negligible elongation under tension, which winkles if the rail 2 is flat but limits the curvature to the desired value.

The rail 2 of FIG. 7a comprises in addition markings 251. The markings 251 are in this embodiment integrated in the carrier ribbon 241 and the ferromagnetic tiles 242 are arranged in such a way that they do not cover the markings 251. In another embodiment, the markings 251 are integrated in the tiles 242 or a separate part fixed to the carrier ribbon or the tiles for example by an adhesive. Preferably, the markings 251 are present of a band which is elastic up to a desired elongation but which has a negligible elongation under tension for elongations greater than the desired elongation and this band is fixed to the upper surface of the ferromagnetic tiles 242 such that a limitation of the possible rail curvature in both directions and the presence of markings 251 are realized with a single additional part. The marking 251 can be used by a displacement sensor in order to control the trolley in such a way that is stays on the rails 2 and/or as position markings to produce the Y-position of the platform. In FIG. 7a the markings 251 are a pattern consisting of black and white stripes of equal thickness allowing a displacement sensor mounted to a moving trolley and using visible or IR light to detect and count the changing reflectivity.

Figure 7B:

FIG. 7b illustrates a cross-section of the rail according to FIG. 7a. The carrier ribbon 241 is realized by a Velcro fastener comprising a first part 61a and a second part 61b. The tile 242 is mounted to the second part 61b while the first part 61a is equipped with an adhesive on its underside. The tile 242 is in this case mounted by an adhesive to the second part 61b of the Velcro fastener. In another embodiment however, the tile 242 is mounted by rivets to the second part 61b of the Velcro fastener. In another embodiment, the tile 242 comprises holes and is sewed onto the second part 61b of the Velcro fastener.

Figure 8A:
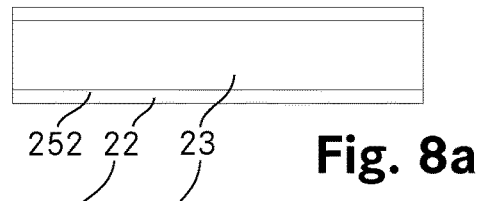

FIG. 8a shows a close-up view onto a rail 2 comprising a guide rail 22 and an insert 23 forming the running surface. The rail 2 of FIG. 8a is similar to the rail 2 shown in FIG. 3b. However, in this case the side walls of the guide rail 22 have a height which equals the height of the insert 23. Therefore, the guide rail 22 of the embodiment of FIG. 8a guides the insert 23 but not the trolley in a mechanical way. The guide rail 22 is made of non-ferromagnetic material. While the guide rail 22 can be comprise a plurality of essentially identical guide-rail elements, in the embodiment shown in FIG. 8a the guide rail 22 is made of a single piece of an elastic material such as silicon rubber. The insert 23 is made of an uninterrupted strip of ferromagnetic material such as steel. The border between the ferromagnetic insert 23 and the non-ferromagnetic guide rail 22 serves as longitudinal feature 252 which can be detected by a positioning sensor 82 in order to control the trolley in such a way that it stays on the rails 2 even without a mechanical guiding system. Such an electronic control can be supported or replaced by coating or designing the surface of the guide rail 22 adjacent to the insert 23 in such a way that the magnetic force between the wheels and the insert 23 is sufficient to pull the wheels back on the running surface formed by the insert 23 if they should try to roll off, for example by ensuring that the friction between the guide rail 22 and the wheels is lower than the friction between the insert 23 and the wheels.

Figure 8B:
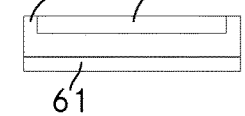

In FIG. 8b, showing a cross-section of the rail according to FIG. 8a, the fact that the side walls of the guide rail 22 have the same height as the insert 23 becomes clearly visible. In order to attach the rails of the embodiment shown in FIG. 8a to the inspection surface, it is possible to use a Velcro fastener 61, as described and shown in detail in FIG. 7b. In another embodiment, an adhesive is directly used on the guide rail 22 or the guide rails 22 are only attached to the inspection surface by adhesion means of the support beams supporting the rails 22.

Figure 9:
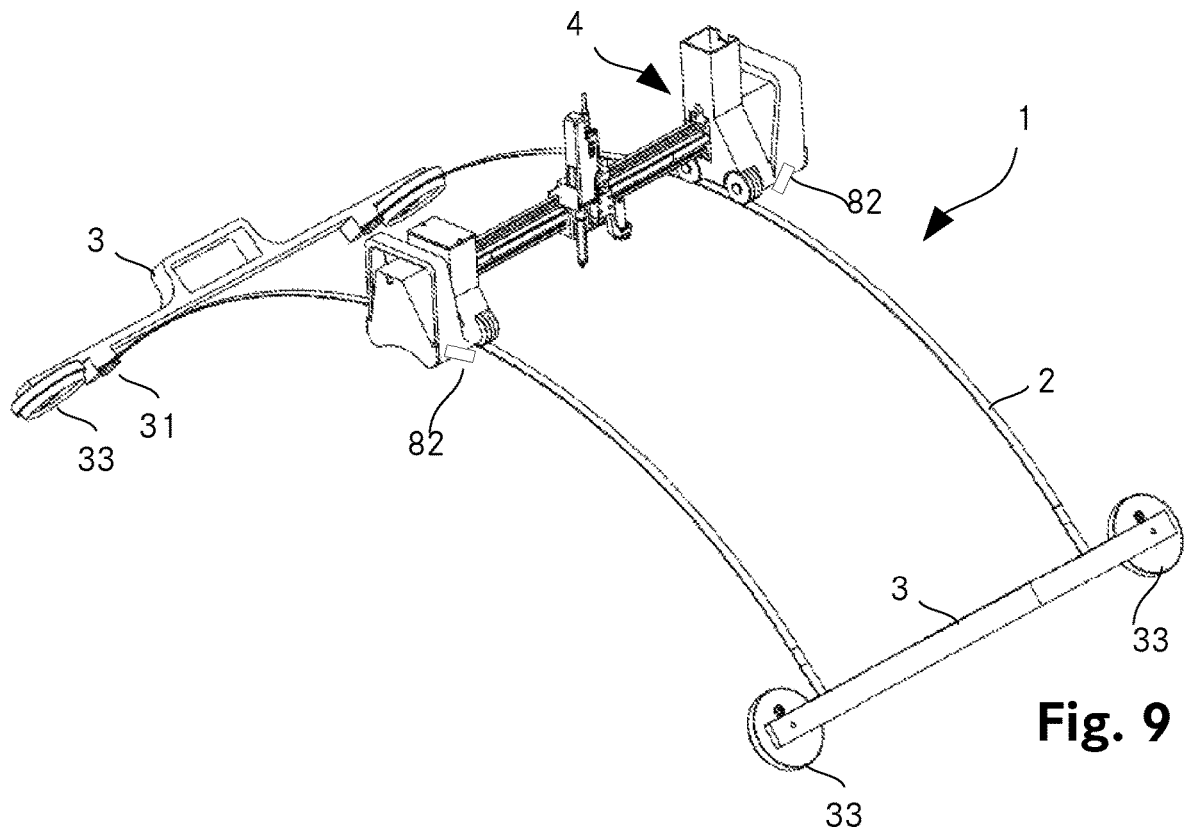
FIG. 9 Isometric view of the entire damage assessment device (DAD) using positioning sensors for guiding the trolley along the rails.

FIG. 9 shows an isometric view of the entire damage assessment device (DAD) using positioning sensors 82 for guiding the trolley 4 along the rails 2. The damage assessment device according to this embodiment is similar to the one shown in FIG. 1a. However, in this case both supporting boxes 42 of the trolley 4 are equipped with a positioning sensors 82. The positioning sensors 82 are preferably inductive or capacitive sensors suitable to detect a signal indicating the distance to a ferromagnetic material. The control of the wheel-motors uses these signals to control the wheels of the trolley in such a way that the distance between the ferromagnetic running surface of the rails 2 and the positioning sensors 82 stays constant. In this way, the control of the wheel-motors replaces the mechanical guidance offered by the non-ferromagnetic sides of guiding-length-section of the rails 2 of FIG. 1a. Therefore, the rails shown in FIG. 9 do not comprise non-ferromagnetic sides. However, it is of course possible to combine both, the mechanical guidance by the sides of the guiding-length-section as well as the electronic guidance by the control of the wheel-motors and the positioning sensors 82 in order to increase the safety.

Figure 10:
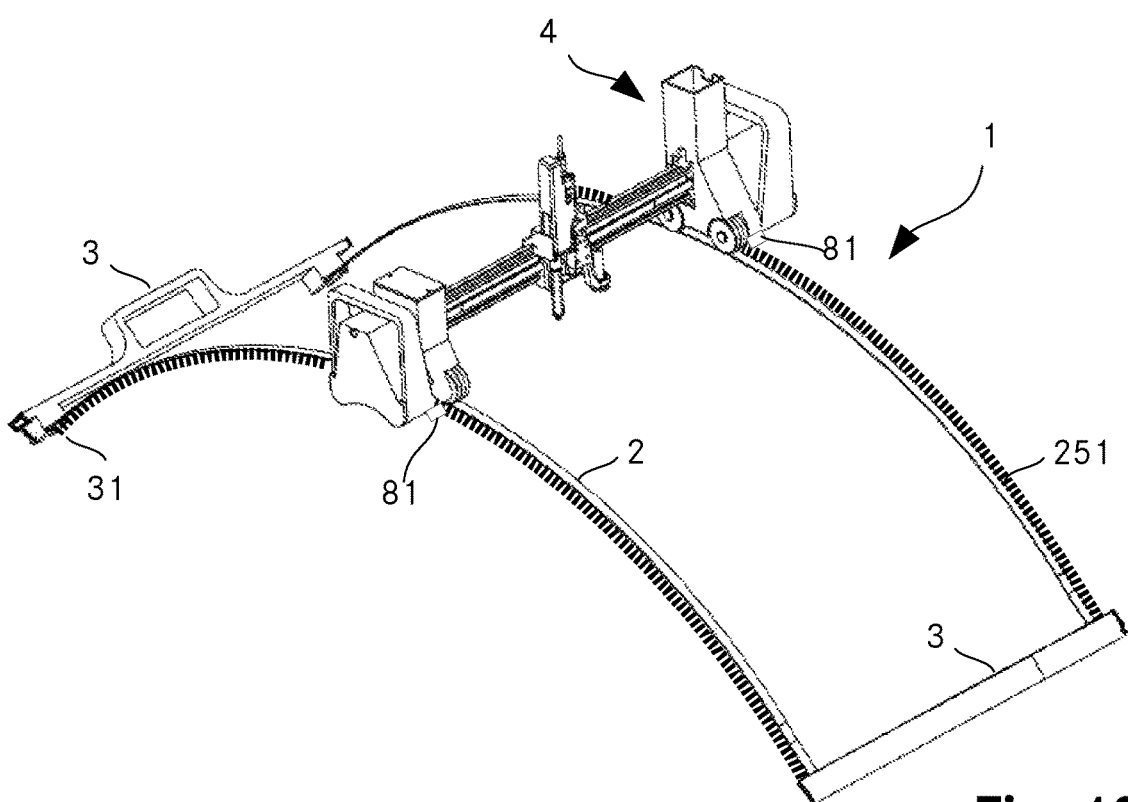
FIG. 10 Isometric view of the entire damage assessment device (DAD) using displacement sensors for guiding the trolley along the rails.

FIG. 10 shows an isometric view of another embodiment of an entire damage assessment device (DAD). This embodiment uses displacement sensors 81 for guiding the trolley 4 along the rails 2. In addition, in this case, the support beams 3 are attached to the inspection surface via the rails 2: In this case, the rails 2 are attached to the inspection surface for example by an adhesive or a Velcro fastener system as discussed in FIG. 7b. The support beams 3 are attached to the rails 2, and not directly to the inspection surface. This allows to use the support beams 3 to remove the rails 2 from the inspection surface and allows a more compact design of the flexible guide rails. In FIG. 10, both rails 2 comprise markings 251 in the form of a strip pattern. The stripes are arranged perpendicular to the longitudinal extent of the rails 2. Both supporting boxes of the trolley are equipped with displacement sensors 81. The displacement sensors 81 are in this embodiment IR sensors equipped with a small IR light source and capable of detecting the reflectivity of the surface in their field of view. As the reflectivity of the white markings is significantly larger than the reflectivity of the black markings, the motion of the trolley 4 along the rails 2 results in a oscillating pattern of high and low reflectivity values wherein the period of this signal is a measure for the speed of the respective supporting box relative to the rail 2 it is moving on. If both supporting boxes move at the same speed, the phase difference between the signal received by the displacement sensor on the first supporting box and by the displacement sensor of the second supporting box is constant. Assuming that both rails follow essentially the same curvature, both supporting boxes should move with the same speed in order to keep the trolley 4 on the rails 2. Therefore, if the control of the wheels controls the wheels of both supporting boxes in such a way that both supporting boxes move at the same speed, the trolley 4 follows the rails 2.

In another embodiment, the supporting boxes are equipped with sensors capable to detect the displacement and the position. These function can either be combined in a single sensor, which observes for example the ferromagnetic tiles, whereby the edge of the tiles acts as longitudinal feature and the change of tiles and space between tiles acts as markings, or both a displacement and a positioning sensor are mounted on each of the supporting boxes. In this embodiment, the trolley 4 is preferably controlled by the positioning signals while the difference in the displacement is used to determine the difference in the curvature of the rails. Evaluating the difference in the curvature of the rails helps to interpret the measurement data as otherwise some of the detected damages on the inspection surface may appear deformed.

In summary, it is to be noted that the platform can carry more than two, only one or no sensor. There can be more than one or no non-destructive testing sensor 10. Instead of a sensor a painting or repairing device or a tool can be mounted to the platform either directly or by replacing the sensor in the sensor mounting or in the depth sensor holder. All sensors can be equipped with their own energy storage and their own wireless transmitters. Further, the adhesion means connecting the support beams to the inspection surface can be made of adhesive tape or otherwise fixed to the inspection surface. Instead of detecting damages such as defects and dents the damage assessment device can also be used to characterize the surface.

In one embodiment, the damage assessment device 16 comprises a trolley 4 with a platform 43 carrying a sensor mounting 11 for various non-destructive testing sensors 10 and an additional depth sensor 13 for estimating the depth of a dent, a flexible and partially ferromagnetic rails 2 in order to keep the trolley 4 on the surface of an aircraft structure and allowing the trolley 4 to move perpendicular to a linear scanning axis, formed by the bridge 41 of the trolley 4, and the possibility for remote-control the device via an external control station 14. The rails 2 are clipped by adhesion means 33 to the aircraft structure.

In one embodiment the damage assessment process is as follows:

(1) Open the transport case 15 and take the support beams 3 and the rails 2,
(2) Stick the adhesion means 33 of the upper support beam 3 to the structure to inspect,
(3) Stretch the rails 2 and stick the adhesion means 33 of the lower support beam 3 to the structure to inspect,
(4) Tighten the rails 2 with ferromagnetic inserts 23 by using the first ratchet,
(5) Make sure the trolley 4 and the non-destructive testing sensor 10 are placed on the reference standard, switch on the trolley 4 and initiate the calibration procedure. The main system 7 will automatically connect to the external control station 14 acting as a remote controller,
(6) After successfully finishing the calibration procedure the trolley 4 is ready for the surveying and inspecting the structure to inspect,
(7) Take out the trolley 4 from the transport case 15 and stick the magnetic wheels 421 onto the ferromagnetic insert 23, preferably by inserting the magnetic wheels 421 into the guide rails 22,
(8) When the trolley 4 is securely stick to the guide rails 22 the inspection and surveying process can be started remote-controlled from the external control station 14,
(9) The damage assessment device is now scanning and inspecting the inspection surface by driving the permanent magnetic wheels 421 (y-axis) and by driving platform 43 carrying the sensor mounting 11 along the bridge 41 of the trolley 4 (x-axis).
(10) The entire damage assessment process is remote-controlled by the operator by issuing suitable commands through the external control station 14 and the relevant data is transmitted from the damage assessment device 16 to the external control station 14 at the remote location of the operator.

The invention claimed is:
1. A flexible guide rail system, comprising
two rails,
two support beams and
a trolley
wherein each rail is bendable in only one direction perpendicular to its longitudinal extent and which includes a guiding-length-section with an at least partially ferromagnetic running surface
wherein each support beam includes
two attachment regions located in a scanning distance from each other,
wherein an each of the attachment regions is for supporting one end of one rail, and
wherein the trolley includes a bridge, two supporting boxes and a platform wherein the bridge connects the two supporting boxes which are arranged in the scanning distance from each other, and wherein the platform is guided by the bridge and is movable along the bridge and whereby each of the two supporting boxes is equipped with two wheels arranged behind each other, wherein the wheels include a permanent magnetic material such that the rails and/or the support beams can be attached to an inspection surface and that the rails allow the trolley to follow the inspection surface in a controlled and guided motion once its wheels are placed on the rails.

2. The flexible guide rail system according to claim 1, wherein each rail includes a flexible carrier ribbon and a plurality of ferromagnetic tiles of similar, rectangular shape and which are mounted to the carrier ribbon in such a way that long sides of adjacent tiles face each other such that the tiles form the running surface with a width defined by the length of the long sides of the tiles.

3. The flexible guide rail system according to claim 2, wherein the carrier ribbons are connected to the respective attachment regions of the support beams.

4. The flexible guide rail system according to claim 1, wherein the guiding-length-section each rail has a cross-section which is u-shaped and wherein the bottom of this u-shape is at least partially ferromagnetic and wherein the distance between the sides of this u-shape is the inner u-shape width and wherein the height of the sides of this u-shape, measured from and perpendicular to the bottom of the u-shape, is the inner u-shape height and wherein each of the support beams includes adhesion means, such that the support beams can be attached to the inspection surface and wherein a radius of the wheels of the trolley is greater than the inner u-shape height and the thickness of the wheels is smaller than the inner u-shape width.

5. The flexible guide rail system according to claim 1, wherein each rail includes a guide rail and an insert and each attachment region is equipped with guide rail attachment means to connect one end of one of the guide rails and insert attachment means to connect one end of one of the inserts), and wherein each guide rail has a guiding-rail-length-section with a cross-section which is u-shaped and is made of non-ferromagnetic material and the guiding-rail-length-section includes a plurality of essentially identical guide-rail elements having a u-shaped cross-section and including first coupling means on one end and second coupling means on an opposite end and wherein the first coupling means of a first guide-rail element can couple to the second coupling means of a second guide-rail element in such a way that a pivot axis is formed around which the first and the second guide-rail element can pivot relative to each other, and wherein each of the inserts is a flat band with a length greater than the length of the guiding-rail-length-section and a width smaller or equal to the inner u-shape width and which includes an uninterrupted strip of ferromagnetic material along its length.

6. The flexible guide rail system according to claim 5, whereby the guide rails include on each end guide rail attachment elements with a guiding-length-end and with a supporting-beam-end, wherein the guiding-length-end includes the first or the second coupling means and wherein the supporting-beam-end and the guide rail attachment means are adapted in such a way that they can form a length-adaptable connection.

7. The flexible guide rail system according to claim 5, whereby adhesive tape is at least partially mounted to the outer bottom side of the guide rail, the running surface or the carrier ribbon or forms the carrier ribbon to allow an adhesive contact between the guide rail, the running surface or the carrier ribbon and an inspection surface on which the flexible guide rail system is used.

8. The flexible guide rail system according to claim 1, wherein at least one of the supporting boxes includes at least one proximity sensor which can determine a contact or a predefined distance to at least one of the support beams.

9. A damage assessment device comprising a flexible guide rail system according to claim 1, and a sensor with sensor mounting fixed to the platform, whereby the sensor with sensor mounting includes a sensor including a sensor head, a flat circular base plate with a central opening and an outer thread a screwable sleeve a three-dimensional bearing and a sensor holder wherein the sensor head is placed in the central opening of the circular base plate and wherein the screwable sleeve is placed over the sensor and screwed onto the outer thread of the circular base plate such that the sensor and the circular base plate are connected and wherein the assembly of sensor, circular base plate, and screwable sleeve is mounted to the sensor holder by the three-dimensional bearing.

10. A packed damage assessment device comprising a damage assessment device and a transport case for a trolley with a sensor mounting carrying a sensor which is a part of damage assessment device according to claim 9, wherein the transport case includes fixing means to fix the supporting boxes in a well-defined position with respect to the transport case while allowing the platform with the sensors mounted to it to move along the bridge and wherein the transport case includes one or more reference standards such that a calibration measurement can be conducted while the supporting boxes are fixed by the fixing means and whereby the trolley is fixed inside the transport case.

11. A method of preparing an inspection using the damage assessment device according to claim 9 comprising:

mounting the flexible guide rail system on the inspection surface;

switching the trolley on; and placing the trolley onto the rails.

12. A method of preparing an inspection according to claim 11, whereby a flexible guide rail system is mounted on the inspection surface by executing the steps of:

mounting the first support beam to the inspection surface using the adhesion means;

mounting the second support beam to the inspection surface using the adhesion means such that the rails are tightened between the support beams.

13. A method of conducting an inspection with a damage assessment device according to claim 9 comprising:

instructing a person to prepare, or preparing, an inspection of an inspection surface;

starting a scanning process by issuing a suitable command from the external control station;

receiving the results and possible warnings from the damage assessment device;

reviewing the results in order to decide if further measurements are needed and if this is the case, instructing the damage assessment device by sending appropriate commands from the external control station;

if no further measurements are needed, receiving the final results and reviewing them.

14. A scanning process conducted by the damage assessment device according to claim 9 comprising:

receiving a command to start a scanning process;

moving the platform in one direction until a proximity sensor detects a predefined distance to one of the support boxes;

moving the wheels of the trolley in one direction until at least one proximity sensor detects a predefined distance to one of the support beams;

moving the platform along the beam and the trolley along the rails in a chosen scanning pattern while capturing measurement data, X-position data and Y-position data;

combining the data in dataset associating the measurement data with a set of position data indicating the position of the measurement.

15. A method of using the flexible guide rail system according to claim 1, comprising:

mounting a sensor to the platform; and with the sensor, scanning an aircraft surface and determining, from a sensor output, properties of the aircraft surface.

* * * * *